(12) United States Patent
Matsuda

(10) Patent No.: US 6,389,496 B1
(45) Date of Patent: May 14, 2002

(54) BRIDGE INCLUDING PORTALS WITH ABILITY TO REDEFINE NETWORK TOPOLOGY

(75) Inventor: Junichi Matsuda, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/240,636

(22) Filed: Jan. 29, 1999

(30) Foreign Application Priority Data

Jan. 29, 1998 (JP) .......................................... 10-017368

(51) Int. Cl.[7] .............................................. G06F 13/00
(52) U.S. Cl. ......................... 710/131; 710/38; 710/268; 709/238; 370/285; 370/402
(58) Field of Search ...................... 710/31–38, 129–132, 710/268; 709/238–244; 370/285–389, 402

(56) References Cited

U.S. PATENT DOCUMENTS

| | | | |
|---|---|---|---|
| 5,193,149 A | * | 3/1993 | Awiszio et al. |
| 5,309,432 A | * | 5/1994 | Kanakia ...................... 370/412 |
| 5,315,592 A | * | 5/1994 | Conant et al. ............... 370/401 |
| 5,432,907 A | * | 7/1995 | Picazo, Jr. et al. ........... 709/249 |
| 5,519,858 A | * | 5/1996 | Walton et al. ................. 707/10 |
| 5,923,673 A | * | 7/1999 | Henrikson ................... 714/712 |
| 5,978,854 A | * | 11/1999 | Fujimori et al. ............. 709/245 |
| 5,983,269 A | * | 11/1999 | Mattson et al. ............. 709/221 |
| 6,131,119 A | * | 10/2000 | Fukui .......................... 709/224 |

* cited by examiner

*Primary Examiner*—Christopher B. Shin
(74) *Attorney, Agent, or Firm*—Dickstein Shapiro Morin & Oshinsky LLP

(57) ABSTRACT

An initialization of local buses 14a to 14n, a definition of topology and a management of isochronous resources are performed for every local bus. Each of portals 12a to 12n includes an asynchronous packet discriminator 215 which discriminates an asynchronous packet sent by a terminal device and transfers it. The portals 12a to 12n discriminate asynchronous packets sent by terminal devices in order to acquire isochronous resources and secure isochronous resources on different buses. The portals 12a to 12n transfer isochronous packets to different local buses by associating a received isochronous packet with a plug on the bridge bus side and a plug on the local bus side with an isochronous channel on the bus. Thus, the utilization efficiency of bus resource in a serial bus network is improved and a packet sent from a terminal device can be transferred to a different bus.

14 Claims, 32 Drawing Sheets

| 61~ | destination_ID | | tl | rt | tcode | pri |
|---|---|---|---|---|---|---|
| 62~ | source_ID | | | | | |
| 63~ | destination_offset | | | | | |
| | heder_CRC | | | | | |

Prior Art

FIG.2

| 61~ | destination_ID | | tl | rt | tcode | pri | |
|---|---|---|---|---|---|---|---|
| 62~ | source_ID | | | | | | |
| 63~ | destination_offset | | | | | | |
| | data_length | extended_tcode | | | | | ~ 64 |
| | heder_CRC | | | | | | |
| | arg_value | | | | | | |
| | data_value | | | | | | |
| | data_CRC | | | | | | |

Prior Art

FIG.3

BRIDGE INCLUDING PORTALS WITH ABILITY TO REDEFINE NETWORK TOPOLOGY

CROSS REFERENCE TO RELATED APPLICATIONS

The present invention claims priority from Japanese Patent Application No. 10-017368 filed Jan. 29, 1998, the contents of which are incorporated herein by reference.

BACKGROUND OF THE INVENTION

1. Field of the Invention

The present invention relates to a bridge for performing a transmission/receiving of signals between mutually independent serial buses in a serial bus network constructed with a plurality of terminal devices connected through the serial buses and, particularly, an apparatus and method for initializing the network connected to the bridge and defining a topology and an apparatus and method for transferring packets in the network.

2. Description of Related Art

In response to the request of improvement of the data processing capability of a computer and the request of processing of a large amount of data in such a case of a motion picture, the request of transfer of a large amount of data between devices is being increased recently.

As a serial bus suitable for a transfer of a large amount of data, a high-speed serial bus standardized by IEEE (the Institute of Electrical and Electronics Engineers) 1394 is known. Such high-speed serial bus will be referred to as "IEEE 1394 Serial Bus", hereinafter, and is disclosed in detail in "IEEE Standard for High Performance Serial Bus" IEEE, Inc., 96.8.

When the IEEE 1394 serial bus is used, it is possible to connect respective terminal devices in a daisy chain connection and to connect them in a star connection by branching a plurality of wiring from each device. Further, it is possible to construct a network in which the daisy chain connection and the star connection are provided in a mixed state. FIG. 1 shows an example of the network using the IEEE 1394 serial bus.

The IEEE 1394 serial bus transmits data formed according to the CSR architecture defined by IEEE 1212. Data formed according to the CSR architecture forms an address space and upper 16 bits of this address space are used to specify a terminal device. 10 bits among the upper 16 bits represent a bus_ID specifying a serial bus, the remaining 6 bits represent a node_ID specifying the terminal device. Therefore, the network for transmitting data formed according to the CSR architecture can be provided with 1023 buses at maximum and 64 terminal devices at maximum can be connected to each of these buses. Data whose value of bus_ID is 1023 represents data to be transmitted to a local bus, that is, a bus directly connected to a terminal device from which the data is transmitted, and data whose node_ID is 63 represent data to be transmitted to all of the terminal devices in the network, that is, data in "broadcast address". Therefore, the number of terminal devices which can be connected practically to the network for mutually connecting the terminal devices through a single bus is 63.

In FIG. 1, the terminal devices 291a to 291g are mutually connected through twisted pair lines 292 with feeder lines, each twisted line functioning as a transmission line as well as a feeder line, and the terminal devices apply a predetermined bias voltage to the twisted pair lines 292.

In the network shown in FIG. 1, when an insertion of a new terminal device to the network or a separation of a terminal device connected to the twisted pair line 292 occurs, that is, when a new terminal device is connected to a twisted pair line 292 or a terminal device is disconnected from a twisted pair line 292, the bias voltage applied thereto is changed. Therefore, an occurrence of the insertion or separation of a terminal device with respect to the twisted pair line can be detected by the terminal devices connected to the twisted pair line by detecting the change of the bias voltage of the twisted pair line.

A terminal device which detects the occurrence of the connection or disconnection of a terminal device with respect to the twisted pair line sends a bus reset signal for initializing the network to the twisted pair line. In response to the bus reset signal, the respective terminal devices cancel a network topology information thereof, that is, information indicative of the bus in the network and the terminal devices connected to the bus, stored therein, to allow the whole network to be initialized. Transmission and/or receiving of packets between the respective terminal devices become impossible during a time in which the network initialization is performed.

After the initialization of the network is completed, a re-definition of topology, that is, update of network topology information, is performed automatically and a route node of the network, that is, a terminal device which manages control rights of the respective buses in the network, is determined. Thereafter, node_ID's are re-assigned to the respective terminal devices. In this case, an isochronous resource manager (IRM) for managing a isochronous source, that is, an isochronous channel for performing an isochronous transmission and a bandwidth to be used, is also determined. Details of this matter is indicated in IEEE 1394.1995 Appendix E.3.1–E.3.4.

Since the initialization of the network and the setting of the terminal devices due to the insertion or separation of terminal devices with respect to the twisted pair lines are automatically performed, a user of the network is not required to be conscious of the state change of the network.

On the network using IEEE 1394 serial bus such as shown in FIG. 1, a communication of asynchronous data (data for asynchronous transmission) and isochronous data (data for isochronous transmission) are possible. In the network shown in FIG. 1, when a terminal device wishes to transfer a packet, an arbitration sequence defined by IEEE 1394–1995 is performed first. That is, the terminal device requests the root node a bus control right and, when the bus control right is given from the route node to the terminal device, it can transmit the packet. Details of the arbitration sequence is disclosed in IEEE 1394–1995.3.7.3.2.

Further, since it is possible to guarantee the isochronous data transmission in the network using IEEE 1394 serial bus, the isochronous data communication is possible. As mentioned above, in the network shown in FIG. 1, one of the terminal devices performs the IRM function of the serial bus network. The terminal device which transmits the isochronous data inquires the IRM of available isochronous resource by using an asynchronous packet before the transmission of the isochronous data. That is, the terminal device reads values of a BANDWIDTH_AVAILABLE register and a CHANNEL_AVAILABLE register which are provided in the IRM and store information indicative of isochronous resource which can be utilized by the network by performing a quadlet read transaction (data read) with using an asynchronous packet having a data structure shown in FIG. 2.

The terminal device which inquired the available isochronous resource confirms whether or not it is possible to acquire an isochronous resource necessary for transmission of the isochronous data on the basis of the information obtained as a result of the inquiry and, when it is possible to acquire the isochronous resource, the terminal device performs a lock transaction with respect to the IRM by using an asynchronous packet having a data structure shown in FIG. 3. That is, the terminal device transmits an asynchronous packet which is shown in FIG. 3 and has a value "0002" in its extended_tcode field 64. Then, contents of the BANDWIDTH_AVAILABLE register and the CHANNEL_AVAILABLE register are compared and swapped with each other. That is, data stored in these registers are compared with data to be written in these registers and portions of the stored data which are different from the data to be written are updated. When the comparison and the swapping are completed, the terminal device becomes in a state in which it can transmit the isochronous data.

Further, in the network using the IEEE 1394 serial bus, one of the terminal devices becomes a route node, as mentioned previously. The terminal device as the route node sends a cycle start packet having a predetermined format to a bus with a predetermined time interval. A terminal device which acquired the isochronous resource of the bus transmits isochronous data every time it detects the cycle start packet. In this manner, the route node guarantees the isochronous data communication, that is, the isochronous transmission, of the terminal device which acquired the isochronous resource with the predetermined time interval.

There is a method of constituting a network by connecting a plurality of independent serial buses by means a bridge. FIG. 4 shows a bridge standardized by P1394.1 Draft Standard 0.02 and a concept of a network using the bridge. In FIG. 4, a bridge 321 is equipped with two or more portals 322a to 322c. The bridge 321 connects serial buses (local buses) connected to the respective portals to each other and the bridge 321 and these local buses constitute a network called "serial bus network".

It should be noted that, although P1394 Draft Standard 0.02 discloses a concept of the bridge, contents of registers included in the respective portals and a basic procedures of a packet transfer, there is no indication of a content of a switching function of the bridge, that is, a function to be performed by the bridge in transferring a packet, in P1394 Draft Standard 0.02.

Further, in transferring an asynchronous packet in P1394 Draft Standard 0.02, a content of destination_ID in a header 61 of the asynchronous packet is judged by a portal and an input/output of the asynchronous packet between a local bus and a transmission path within the bridge is controlled according to a result of the judgement.

Further, in transferring an isochronous packet in P1394 Draft Standard 0.02, a channel to be used by the isochronous packet to be transferred is preliminarily assigned and the isochronous packet is transferred by using the assigned channel. However, no standardized procedure for assigning the channel is disclosed in P1394 Draft Standard 0.02.

In the isochronous packet transfer mentioned above, "plug" and "plug control register (PCR)" defined by IEC 61883 are used. A plug is a virtual port for performing an input/output of isochronous data. The plug is not a physical port which functions as a plurality of plugs for controlling a plurality of data flows. The PCR is a register for writing an information indicative of isochronous channel number and occupied bandwidth used by the plug in transferring isochronous data between ports of devices which transmit data by using IEEE 1394 serial bus. The plug is coupled to the isochronous channel and disconnected from an isochronous channel by writing, therein, data stored in the PCR.

Incidentally, although the plug and the PCR are not standardized by IEEE 1394.1995 standard, they are practically mounted on audio visual (AV) devices, etc., and will be standardized by P1394A which is an amendment of IEEE 1394.1995.

A first problem of the above mentioned prior art is that, since the initialization of the network and the re-definition of topology are automatically executed every time when the twisted pair line is inserted or disconnected within the network and the packet transmission and/or receiving becomes impossible during the time in which the network is being initialized, the utilization efficiency of bus becomes low.

There is no concrete method for solving the problem of low utilization efficiency of a bus due to the initialization of a network and the re-definition of topology in the above mentioned P1394.1 showing the method of constituting a network by connecting a plurality of serial buses by using a bridge.

A second problem of the prior art is that the number of terminal devices which can be connected to a network is limited to 63.

A third problem is that, when some of the terminal devices within the network acquire a larger amount of resources of the serial buses than others, a communication between the other terminal devices may become impossible.

That is, in the above mentioned network, all of the terminal devices connected to serial buses commonly own resources of the serial buses and, in order that terminal devices, etc., transmit and/or receive packets, the terminal devices, etc., occupy available resources. The resources occupied by the terminal devices, etc., can not be gotten by other terminal devices, etc., at the same time. Therefore, there may be a case where the other terminal devices, etc., can not acquire necessary resources and the terminal devices, etc., which failed to acquire the resources necessary to perform the packet transmission can not perform packet transmission. Incidentally, the previously mentioned P1394.1 does not show any method of communication in the bridge. That is, a concrete resource managing method including the acquiring of resources in the bridge is not standardized as yet.

A fourth problem is that the above mentioned network has no function of transferring packet between independently existing different serial buses through the bridge. That is, P1394.1 discloses the input and/or output method of packets by means of the portals, while it does not disclose the packet communication method within the bridge. Therefore, the above network cannot transfer packets through the bridge by the method shown in P1394.1.

SUMMARY OF THE INVENTION

An object of the present invention is to provide a bridge, particularly, an IEEE 1394 bridge, capable of improving the utilizing efficiency of bus by performing an initialization of network and a re-definition of topology while avoiding a reduction of a bus utilizing efficiency, when an insertion and/or removal of an active line within a serial bus network occurs.

That is, a bridge of the present invention is constructed with a plurality of portals connected to individual local buses, specifically, IEEE 1394 serial buses, connected to respective external terminal devices and internal buses connecting the portals mutually and is featured by that each of the portals comprises topology information memory means for storing a topology information indicative of the local buses to which the terminal devices are connected, asynchronous packet receiving means for receiving, through the internal buses, asynchronous packets sent from the terminal devices and the portals connected to each other through same ones of the local buses and asynchronous packet discriminator means for judging, on the basis of a destination described in the asynchronous packet received by the asynchronous packet receiving means and the topology information stored in the topology information memory means, the local bus connected to the destination and, when a result of the judgement indicates that the local bus is different from that to which the portal is connected, for transmitting an asynchronous packet to the portal connected to the local bus and, when the result of the judgement indicates that the local bus is the same as that to which the portal is connected, for transmitting an asynchronous packet to the local bus to which the portal is connected.

By constructing a network for the asynchronous transmission by connecting the mutually independent local buses to the respective portals of such bridge, an exchange of asynchronous packets is performed between terminal devices connected to the mutually different local buses.

It is preferable that the IEEE 1394 serial bus is used as the local bus and the bridge of the present invention is utilized as the IEEE 1394 bridge. In such case, by constructing a serial bus network by connecting the mutually independent IEEE 1394 serial buses to the respective portals, an exchange of asynchronous packet between terminal devices connected to the mutually different IEEE 1394 serial buses. In this serial bus network, since the IEEE 1394 serial buses are mutually independent, 63 terminal devices at maximum can be connected to each of the IEEE 1394 serial buses and, therefore, the number of terminal devices which can be connected to the serial bus network is not limited to 63.

The topology information memory means may comprise topology re-definition means for detecting a change of the number of the terminal devices connected to the local buses connected to the portals to which the topology information memory mean belongs, specifying the terminal devices connected to the local bus after the change of the number of terminal devices is detected and supplying an information indicative of the specified terminal devices to other portals and topology information update means for producing a new topology by combining the information supplied from the topology re-definition means of the other portals and the topology information stored by the topology information memory means and storing the new topology information.

Thus, when the number of terminal devices connected to each of the local buses is changed, the portal connected to the same local bus specifies terminal devices connected to the local bus after the change of the number of terminal devices. The information indicative of the newly specified terminal devices is supplied to the respective portals which produce new topology information by combining the supplied information and the topology information stored in the respective portals. Therefore, even when the number of terminal devices connected to any local bus is changed, the initialization is performed for not the whole network but the same local bus, so that there is no need of stopping the packet exchange in the whole network.

Further, the bridge may comprise internal bus resource managing means for receiving the asynchronous transmission packet for requesting a security of an isochronous transmission channel for an isochronous transmission of packet and securing the isochronous transmission channel on the internal bus and each portal may comprise local bus resource managing means for receiving the asynchronous transmission packet for requesting a security of an isochronous transmission channel for an isochronous transmission of packet and securing the isochronous transmission channel on the local bus connected thereto and channel control means for assigning an input port for receiving the isochronous transmission packet through the isochronous transmission channel assigned as a transmitting side or a source of an isochronous transmission packet transmitted by the isochronous transmission, an output port for acquiring the isochronous transmission packet from the input port assigned as the source of the isochronous transmission packet and sending the isochronous transmission packet to the isochronous transmission channel assigned as a destination side of the isochronous transmission packet, the isochronous transmission channel which is the originator side of the isochronous transmission packet to the input port, the input port which is the source side of the isochronous transmission packet to the output port and the isochronous transmission channel which is the destination side to which the output port supplies the isochronous transmission packet.

The network composed of such bridge and the mutually independent local buses connected to the respective portals of the bridge performs an exchange of isochronous transmission packet (isochronous packet) between terminal devices connected to mutually different local buses.

Further, each of the portals of such bridge performs a management of the isochronous transmission resources of the local bus connected to the portal independently from other portals. The management may include a processing for determining parameters such as isochronous transmission channel and its bandwidth, etc., which can be secured on the local buses, for specifying the isochronous channels and a processing for assigning the control right of isochronous transmission channel to the terminal device, etc., which requests the security of the isochronous transmission channel. Therefore, a local bus which has no relation to the exchange of isochronous transmission packet is free from an influence of the isochronous transmission packet exchange, for example, free from such as reduction of transmission efficiency of other packets, so that the isochronous transmission resource of the local bus can be utilized efficiently.

Assuming that at least one of the portals comprises the internal bus resource managing means, there is no need of constituting the internal bus resource managing means by a separate device and, therefore, the structure of this bridge becomes simple and the manufacture of the bridge and the management of the network including this bridge is facilitated.

Each portal is connected to the internal bus resource managing means through, for example, the internal buses.

Assuming that each portal and the internal bus resource managing means are connected to each other through the internal buses such that they constitute a chain without branch, the necessity of changing the internal bus resource managing means when new portals are added to the bridge or some of the existing portals are removed is avoided and the addition and/or removal of portals is facilitated. Therefore, the management of the network including the bridge is also facilitated.

BRIEF DESCRIPTION OF THE DRAWINGS

Preferred embodiments of the present invention will be described with reference to the accompanying drawings, in which:

FIG. 2 shows a format of a conventional asynchronous packet used in a quadlet read transaction;

FIG. 3 shows a format of a conventional asynchronous packet used in a lock transaction;

DETAILED DESCRIPTION OF THE PREFERRED EMBODIMENTS

<First Embodiment>

Figure 5:
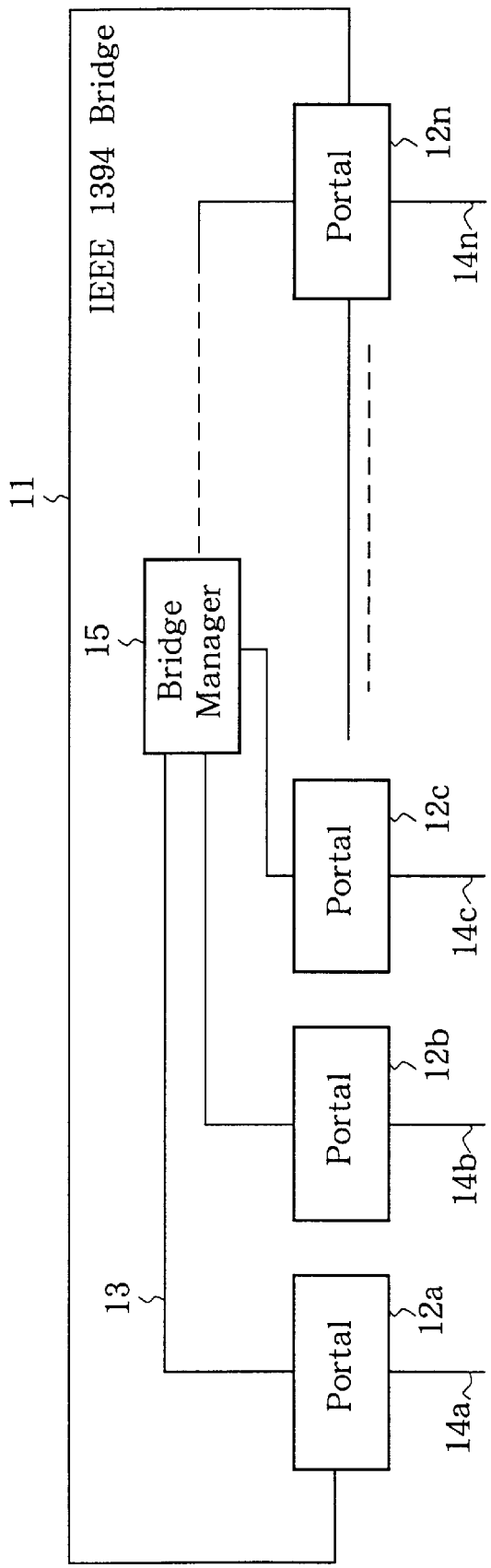
FIG. 5 is a block diagram of a bridge according to a first embodiment of the present invention.

FIG. 5 is a block diagram showing an IEEE 1394 bridge according to a first embodiment of the present invention. As shown in FIG. 5, the IEEE 1394 bridge 11 is constructed with a plurality of portals 12a to 12n, bridge buses 13 and a bridge manager 15.

The portals 12a to 12n function as terminal devices connected to a plurality of local buses 14a to 14n, respectively. The portals 12a to 12n are star-connected to the bridge manager 15 through respective bridge buses 13 which are internal buses of the IEEE 1394 bridge 11 so that the portals can communicate with each other.

The bridge bus 13 comprises an IEEE 1394 serial bus similar to that constituting the local bus. The bridge manager 15 functions as an isochronous resource manager (IRM) which manages a communication procedure on the bridge bus 13 and isochronous resources, that is, isochronous channel for an isochronous transmission and a bandwidth to be used in that channel. The bridge manager 15 further performs a route function for sending a packet onto the bridge bus 13 with a constant time interval. This packet is transferred, as a cycle start packet, from the portals 12a to 12n which receive the packet to the local buses 14a to 14n. The cycle start packet is used to determine an isochronous data transmission timing of a terminal device which acquires the isochronous resources of the local buses 14a to 14n.

Figure 6:
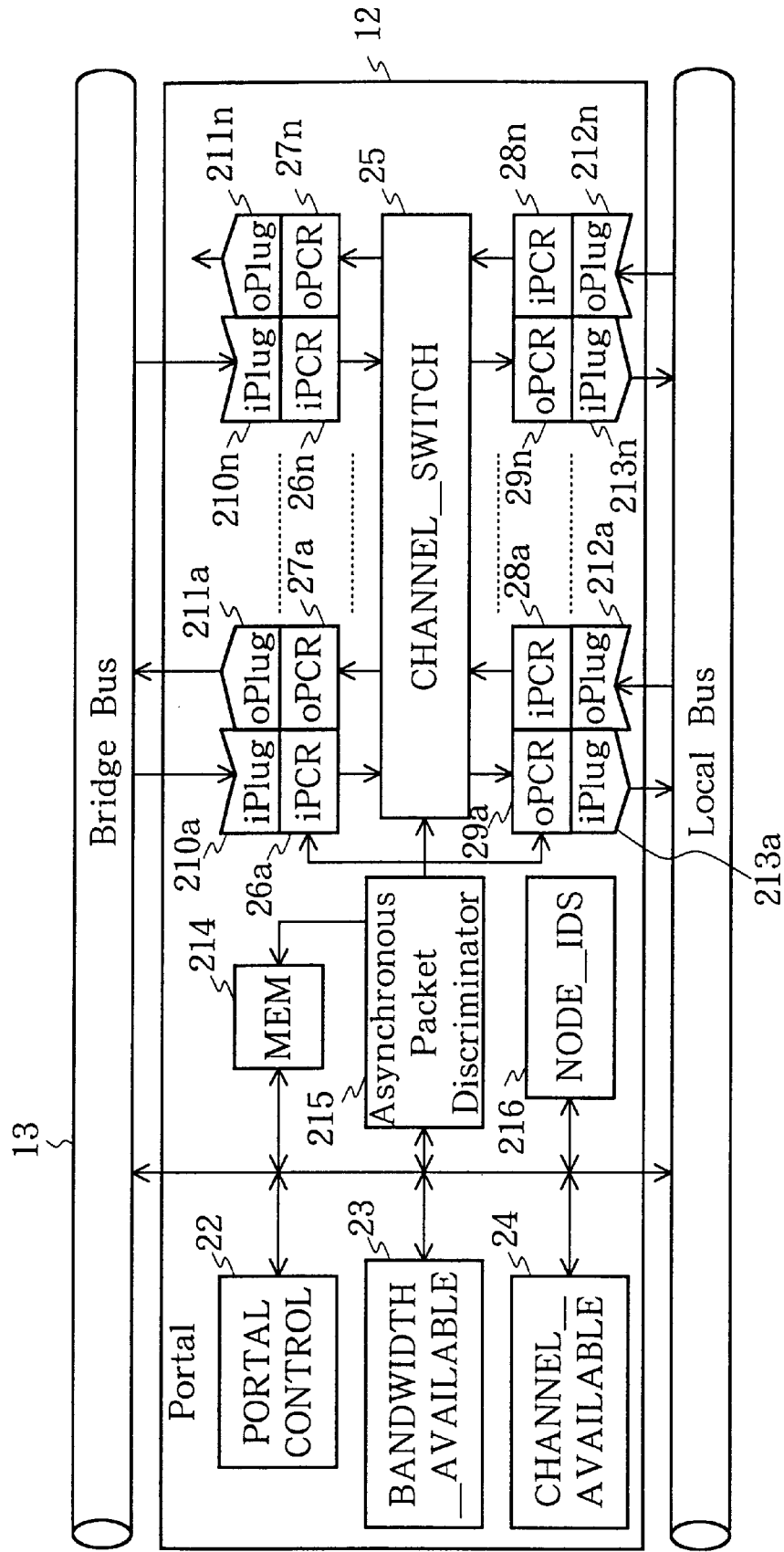
FIG. 6 is a detailed block diagram of a portion of the bridge shown in FIG. 5.

FIG. 6 is a block diagram of the portal 12a. It should be noted that the other portals 12b to 12n have substantially the same construction as that of the portal 12a.

As shown in FIG. 6, the portal 12a is constructed with a portal control register 22, a BANDWIDTH_AVAILABLE register 23, a CHANNEL_AVAILABLE register 24, a CHANNEL_SWITCH register 25, input plug control registers (iPCR's) 26a to 26n and 28a to 28n, output plug control registers (oPCR's) 27a to 27n and 29a to 29n, input plug's (iPlug's) 210a to 210n and 212a to 212n, output plug's (oPlug's) 211a to 211n and 213a to 213n, a memory 214, an asynchronous packet discriminator 215 and a NODE_IDS register 216.

The portal control register 22 stores information indicative of states of the bridge bus 13 and the local bus 14 to which the portal 12 is connected, that is, the local bus 14a for the portal control register 22 of the portal 12a. In concrete, the value of the portal control register 22 being 0 indicates that the local bus 14a or the bridge bus 13 are initialized as to be described later, in which case the portal 12a does not transfer any packet. On the other hand, when the value of the portal control register 22 is not 0, the portal 12a becomes in a state in which the packet received thereby can be transferred.

The asynchronous packet discriminator 215 discriminates whether or not the received packet is transferred by referencing a destination_ID field in a header of the asynchronous packet received from the local bus connected to the bridge bus 13 and the asynchronous packet discriminator 215. Further, the asynchronous packet discriminator 215 discriminates whether or not the received asynchronous packet is to inquire bus resources for a portal to which other local buses are connected, on the basis of a content of a destination_offset field contained in the received asynchronous packet and the result of discrimination of the destination_ID field. Further, the asynchronous packet discriminator 215 determines whether or not the received packet is to acquire the isochronous resources, on the basis of an extended_tcode field contained in the received asynchronous packet.

The NODE_IDS register 216 stores information for discriminating the respective terminal devices connected to the serial bus network, that is, for example, the network constituted with the IEEE 1394 bridge 11, the local buses 14a to 14n and the terminal devices connected to the local buses 14a to 14n.

The iPlug's 210a to 210n and 212a to 212n and the oPlug's 211a to 211n and 213a to 213n are related to specific isochronous data transfer channels secured on the bridge bus 13 and the respective local buses 14a to 14n by the terminal devices, etc., as to be described later. The portal 12a performed the input/output of isochronous data as to be described later.

The iPCR 26a to 26n and 28a to 28n and the oPCR 27a to 27n and 29a to 29n store information indicative of channels on the local buses 14a to 14n or the bridge bus 13 to which the respective iPlug's and the respective oPlug's are to be associated or correlated.

The CHANNEL_SWITCH register 25 stores information indicative of a correlation between iPlugs on the side of the bridge bus and oPlugs on the side of the local bus to which the portal 12 is connected, or between oPlugs on the side of the bridge bus and iPlugs on the side of the local bus to which the portal 12 is connected.

In order to transmit isochronous data, the portal 12a correlates the respective iPlug's or oPlug's on the side of the local bus to the respective oPlug's or iPlug's on the side of the bridge bus according to the content of the CHANNEL_SWITCH register 25.

The BANDWIDTH_AVAILABLE register 23 and the CHANNEL_AVAILABLE register 24 store information of available resources of the local bus to which portals are connected. The information includes the bandwidth and the isochronous channels. The terminal device which transmits the isochronous packet confirms and acquires the resources by referencing these registers.

Further, the portal 12a receives packets transmitted through the local bus to which the portal 12a is connected and packets transmitted through the bridge bus 13. When the value of the portal control register 22 of the portal 12a is not 0, the portal 12a always transfers the cycle start packet which is transmitted by the bridge manager 15 onto the bridge bus 13 with a constant time interval to the local bus to which the portal 12a is connected.

[Operation]

An operation of the portal 12a shown in FIG. 6, particularly, the initialization of the serial bus network, the re-definition of topology and the packet transfer, will be described with reference to FIGS. 7 to 9. It should be noted that operations of other portals 12b to 12n are substantially the same as that of the portal 12a.

Figure 7:
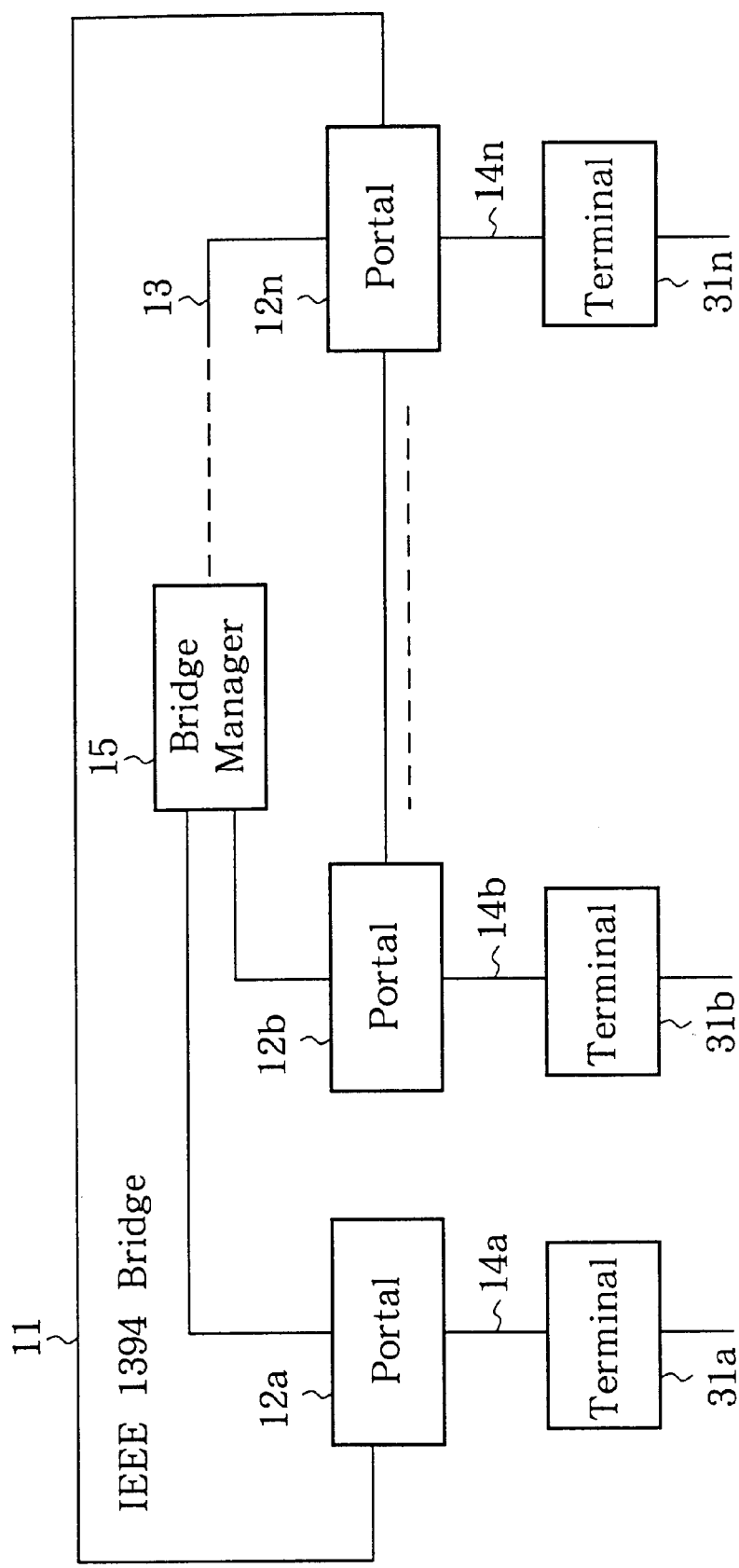
FIG. 7 shows an example of a serial bus network constructed by connecting independent local buses by means of the IEEE 1394 bridge shown in FIG. 5.

FIG. 7 shows an example of the serial bus network constituted with the IEEE 1394 bridge 11, the local buses 14a to 14n and the terminal devices connected to the local buses 14a to 14n.

[Initialization of the Serial Bus Network and Definition of Topology]

In order to perform a communication between terminal devices connected to different local buses in the serial bus network shown in FIG. 7, the serial bus network is initialized and the topology is defined, that is, the bridge bus and the local buses contained in the serial bus network and the portals and the terminal devices connected to these buses are specified. The initialization of the serial bus network and the definition of the topology will be described.

Figure 8:
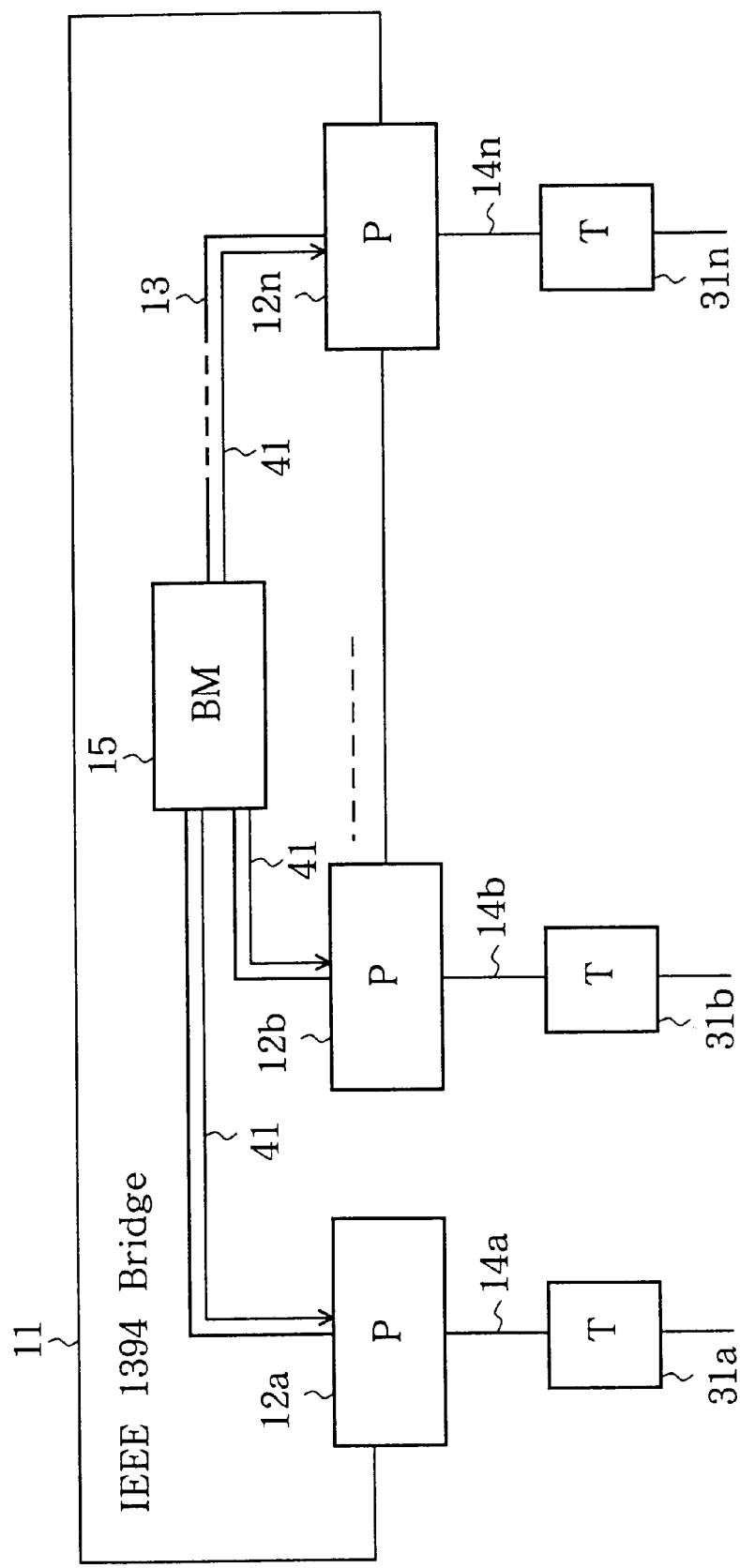
FIG. 8 is a block diagram illustrating operations of respective portions of the serial bus network shown in FIG. 7 when the serial bus network is initialized.

FIG. 8 shows a flow of commands when the serial bus network is initialized.

In FIG. 8, the bridge manager (BM) 15 transmits a bridge bus initialization command 41 to the respective portals to start the initialization of the serial bus network. In response to the bridge bus initialization command 41, the respective portals cancel packets stored in the memories 214 thereof and the contents of the NODE_IDS registers 216 thereof and set the values of the portal control registers 22 thereof to 0, so that the transfer of packets of the respective portals become substantially impossible.

Then, the bridge manager 15 defines the topology on the bridge bus 13. After the bridge bus 13 is initialized through the predetermined procedures, a tree ID process is executed by the procedures defined by, for example, the IEEE 1394.1995 Appendix E.3.2. to define topology of the respective portals on the bridge bus 13. The bridge manager 15 sends a transmission permission to the portals whose topology on the bridge bus 13 is defined.

The portal which receives the transmission permission from the bridge manager 15 transmits a self ID packet to the bridge manager 15. The bridge manager 15 assigns a portal_ID to the portal to which the bridge manager 15 sent the self_ID. The procedure for determining the portal_ID is substantially the same as the procedure for determining the node_ID described in, for example, the IEEE 1394.1995 Appendix E.3.3.

When the portal_ID are assigned to the respective portals 12a to 12n, the initialization of the local buses 14a to 14n and the definition of topology are performed.

Figure 9:
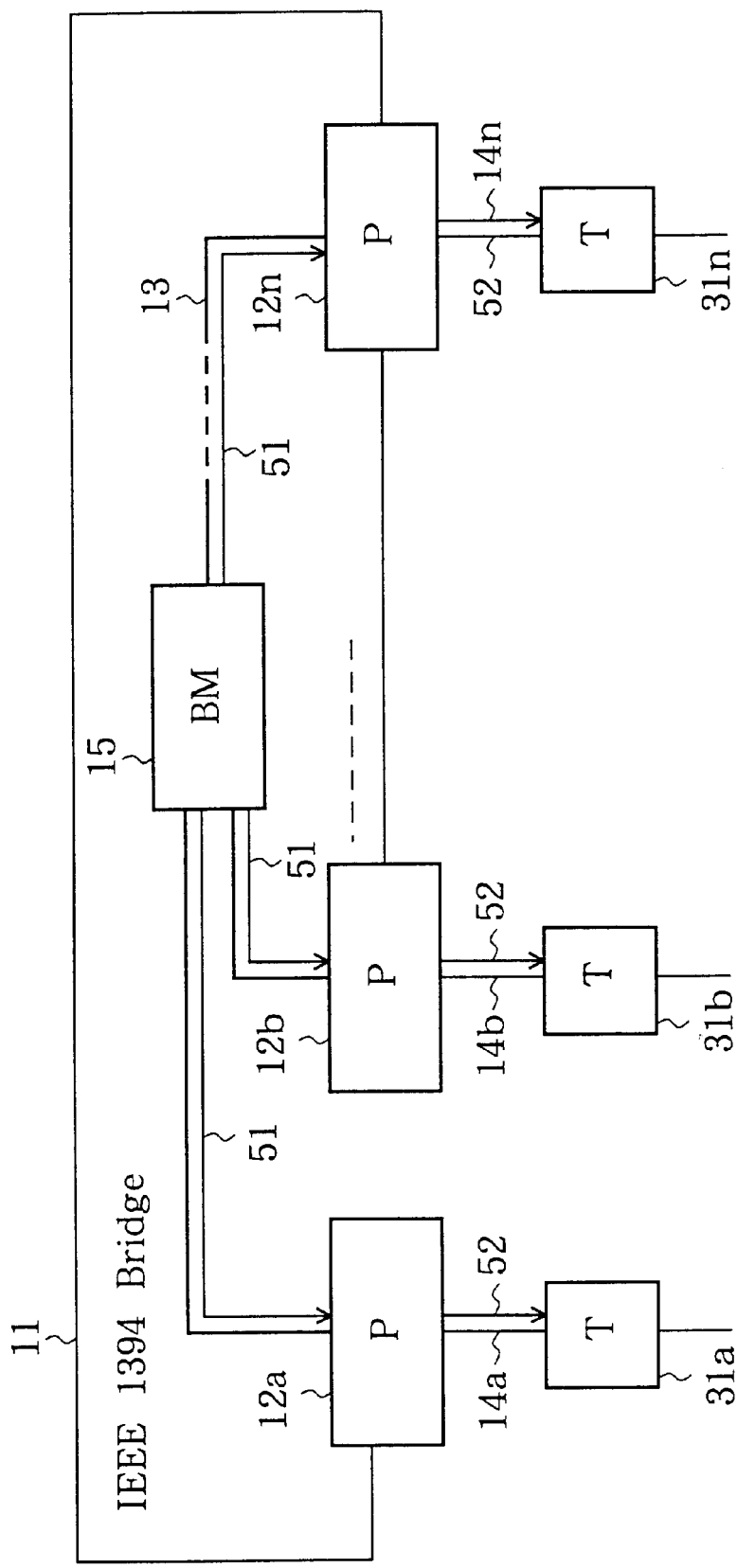
FIG. 9 is a block diagram illustrating operation of the respective portions of the serial bus network shown in FIG. 7 when an initialization and re-definition of local buses are performed.

FIG. 9 shows a flow of commands when the initialization of the local buses 14 and the re-definition of topology are performed.

When the portal_ID is assigned to each of the portals 12a to 12n, the bridge manager 15 sends the local bus initialization command 41 to the bridge bus 13. In response to the local bus initialization command 41, the portals 12a to 12n initialize the respective local buses by sending a bus reset signal 52 to the local buses to which the portals are connected, respectively.

The portals 12a to 12n define (or re-define) topology of the local buses to which the portals are connected, respectively, according to the procedure defined by, for example, the IEEE 1394.1995. In this case, the bus_ID of each of the local buses is assigned such that it coincides with the portal_ID assigned to the portal which is connected to corresponding one of the local buses. Further, in defining topology, each of the portals 12a to 12n assigns itself to a route and an IRM of the corresponding local bus to which the portal is connected.

The NODE_IDS register 216 of each of the portals 12a to 12n stores information for identifying the terminal device connected to the local bus to which the portal is connected. Thus, the portals 12a to 12n complete the initialization and definition of topology of the local buses 14a to 14n.

When the initialization of the local buses 14a to 14n to which the respective portals 12a to 12n are connected and the definition of topology thereof are completed, the portals 12a to 12n transmit the contents of their NODE_IDS registers 216 to the bridge manager 15. After the bridge manager 15 receives the contents of the NODE_IDS registers 216 of the respective portals 12a to 12n, the bridge manager 15 combines the contents and rewrites the contents of the NODE_IDS registers 216 with information obtained by the combination, that is, an information identifying the terminal devices connected to the serial bus network. In concrete, the bridge manager 15 performs a write transaction for writing the information in the NODE_IDS registers 216 of the respective portals 12a to 12n according to the procedure defined by, for example, the IEEE 1394-1995.

Thereafter, the portals 12a to 12n set the values of the portal control registers 22 thereof to 1 so that their packet transfers become possible.

In the serial bus network, there is a case where a new terminal device is connected to any one of the local buses 14a to 14n or the terminal device is disconnected from one of the local buses 14a to 14n. When such state change occurs in any of the local buses 14a to 14n, the local bus in which the state change occurs is initialized by the portal connected thereto and the topology thereof is re-defined by the portal. In this case, the portal sets the value of its own portal control register 22 to 0, so that the portal becomes in a state in which a packet transfer between the local bus and the bridge bus 13 to which the portal is connected becomes substantially impossible.

After the re-definition of topology is completed, the portal transmits the content of the NODE_IDS register 216 thereof to the bridge manager 15. In response to the content of the NODE_IDS register 216 of the portal, the bridge manager 15 rewrites the previous contents of the NODE_IDS registers of the portals 12a to 12n such that they contain the contents of the NODE_IDS register 216 of the portal which performed the re-definition of topology, respectively.

[Packet Transfer]

After the initialization of the serial bus network and the definition of topology are completed, an exchange of asynchronous packets and isochronous packets between the terminal devices connected to the serial bus network becomes possible.

In a case where a terminal device transmits an asynchronous packet, the terminal device requests a portal which is a route of a local bus to which the terminal device is connected to a right of control of the same local bus. The portal gives the terminal device the local bus control right regardless of states of the bridge bus 13 and other local buses than that to which the portal is connected. The terminal device which obtained the local bus control right transmits an asynchronous packet to the same local bus.

When a destination of the asynchronous packet thus transmitted is a terminal device which is connected to the same local bus as that to which the asynchronous packet originator terminal device, other portals which are connected to the local bus do not participate in the asynchronous packet transfer. On the contrary, when the destination of the asynchronous packet is a terminal device connected to another local bus, a portal connected to the same local bus as that to which the packet originator terminal device is connected transfers the asynchronous packet to the destination through the bridge bus 13.

The communication procedure of an asynchronous packet between terminal devices connected to different local buses in the serial bus network will be described with reference to FIGS. 10 to 21.

[Communication Procedure of Asynchronous Packet]

Figure 10:
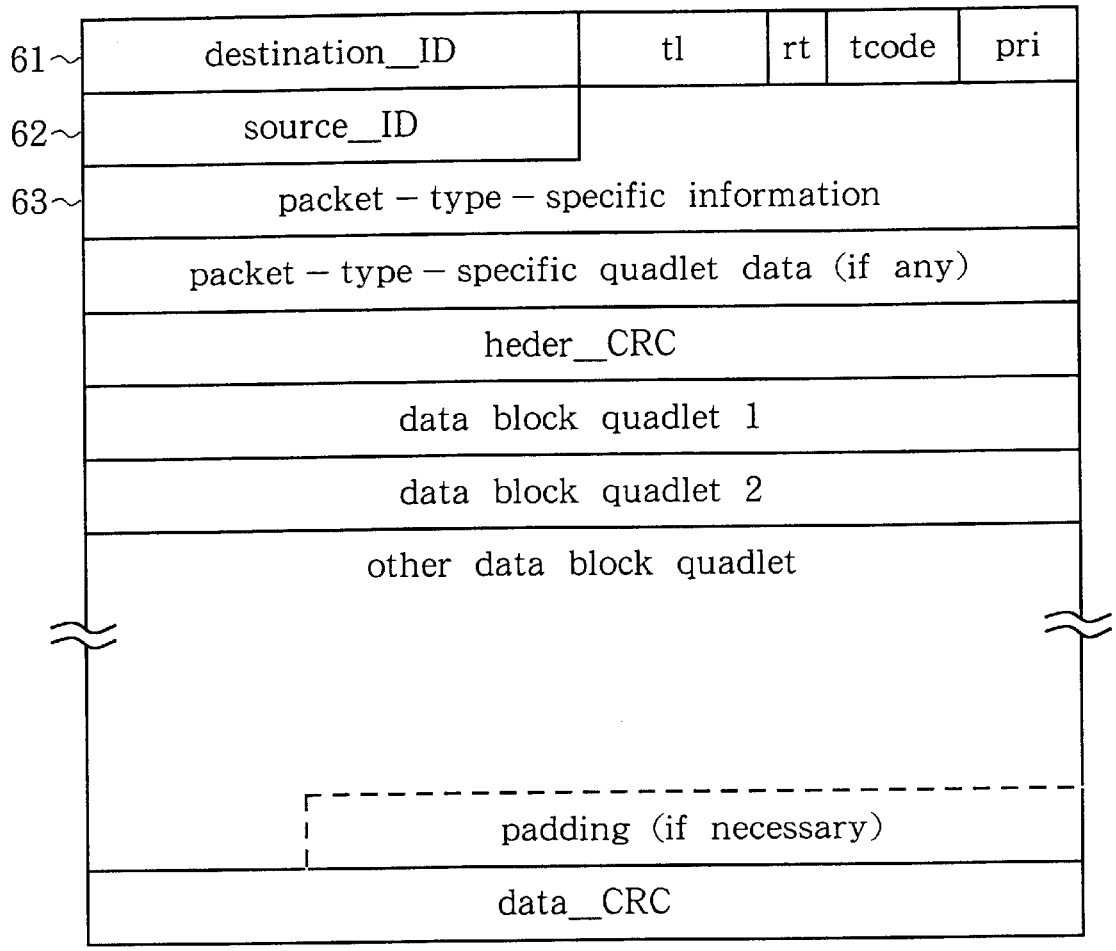
FIG. 10 is a format of an asynchronous packet defined by the IEEE 1394.1995.

FIG. 10 shows an example of a packet format of the asynchronous packet. The packet format shown in FIG. 10 is substantially the same as the packet format defined by the IEEE 1394.1995.

At a head of the asynchronous packet having the format shown in FIG. 10, there is a data region 61 called destination_ID field. A bus_ID and a node_ID of a source terminal device are described in this data region and the source terminal device can be identified by the bus_ID and the node_ID. Further, in a source_ID field 62 which is a data region succeeding the destination_ID field 61, an information for identifying the asynchronous packet source terminal device is described.

Further, the asynchronous packet has a destination_offset field which is not shown in FIG. 10. In this destination_offset field, an address indicative of whether the asynchronous packet is transmitted in order to acquire the values stored in the BANDWIDTH_AVAILABLE register 23 and the CHANNEL_AVAILABLE register 24 is described.

Further, the asynchronous packet has an extended_tcode field which is not shown in FIG. 10. In the extended_tcode field, information indicative of whether the asynchronous packet is transmitted in order to perform the compare and swap operation for the BANDWIDTH_AVAILABLE register 23 and the CHANNEL_AVAILABLE register 24 is described.

Figure 1:
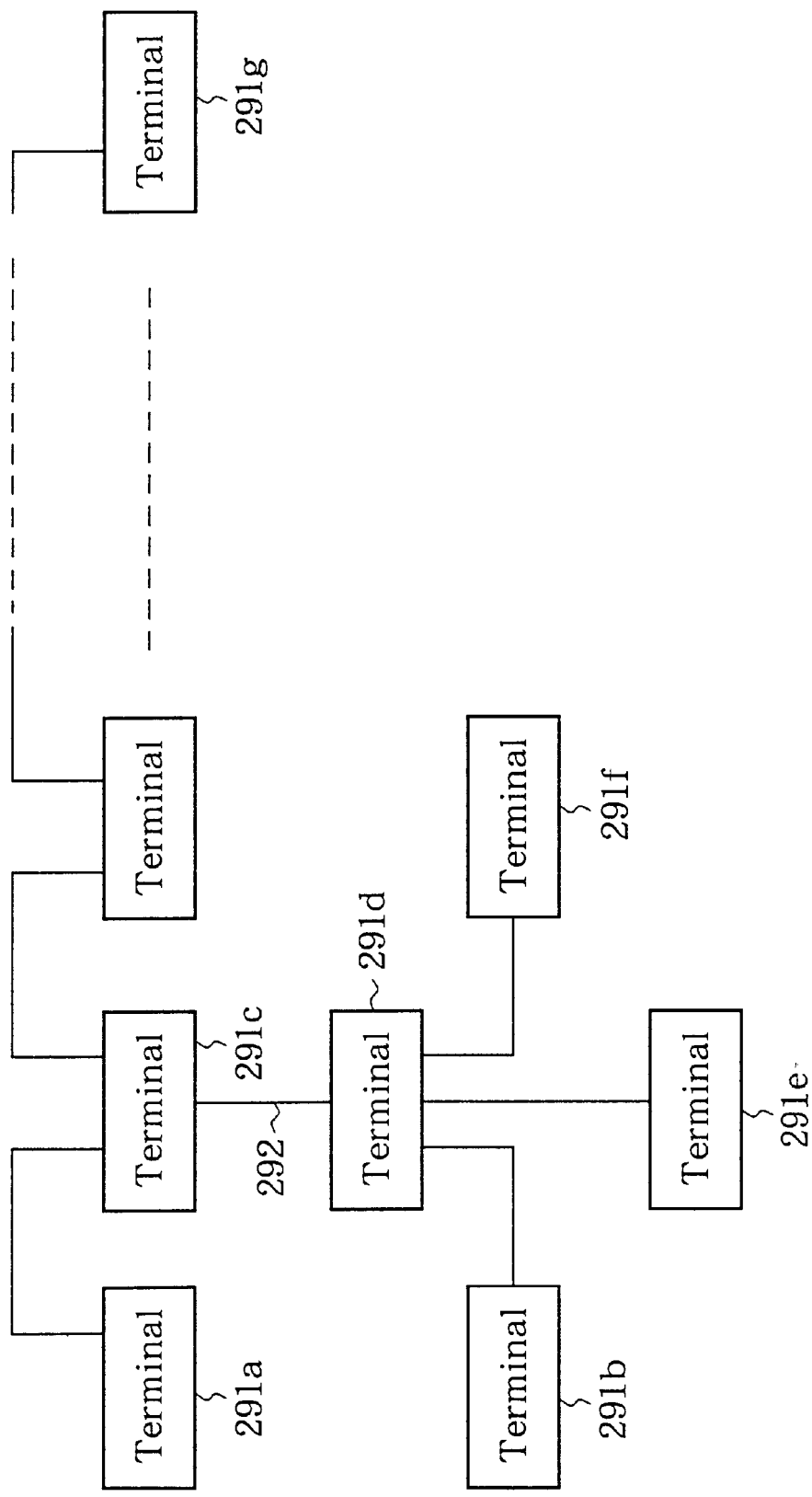
FIG. 1 shows an example of a conventional network using IEEE 1394 serial bus.
Figure 4:
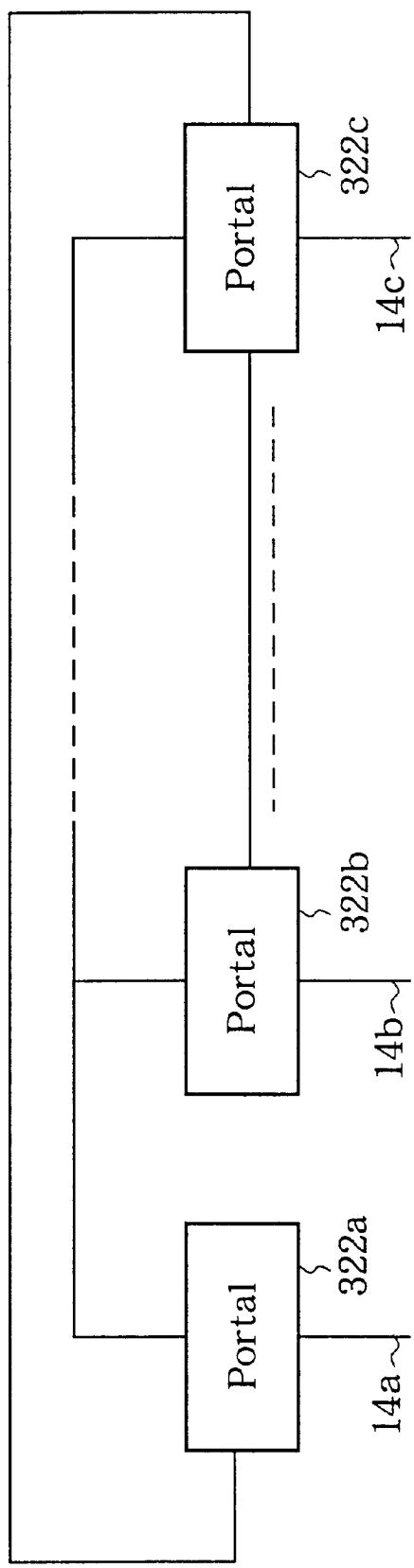
FIG. 4 shows schematically a conventional bridge shown by P1394.1 Draft Standard 0.02.
Figure 11:
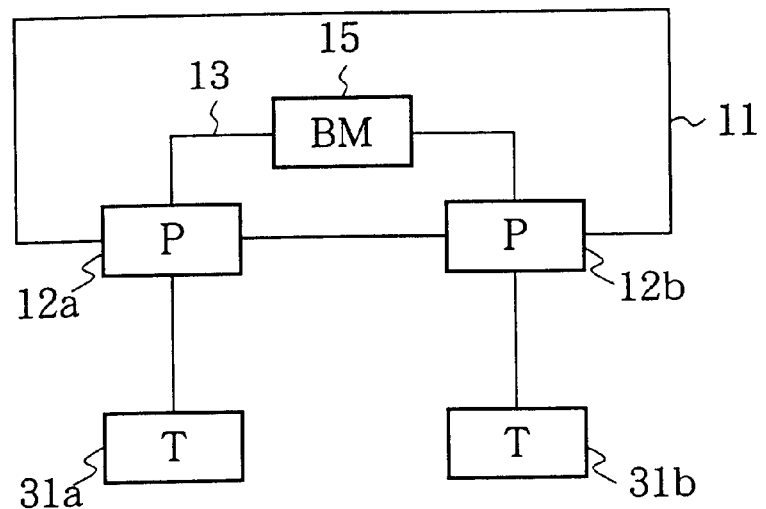
FIG. 11 shows an example of a serial bus network using the IEEE 1394 bridge.

FIG. 11 shows an example of a serial bus network constructed with an IEEE 1394 bridge 11 composed of a bridge manager 15 and two portals 12a and 12b, a terminal device 31a connected to the portal 12a through a local bus and a terminal device 31b connected to the portal 12b through a local bus. The IEEE 1394 bridge 11, the portals 12a and 12b and the bridge manager 15 of the serial bus network shown in FIG. 11 are substantially the same as those depicted by the same reference numerals in FIG. 1.

Now, the procedure for transmitting an asynchronous packet from the terminal device 31a to the terminal device 31b will be described with reference to FIG. 11.

Figure 12:
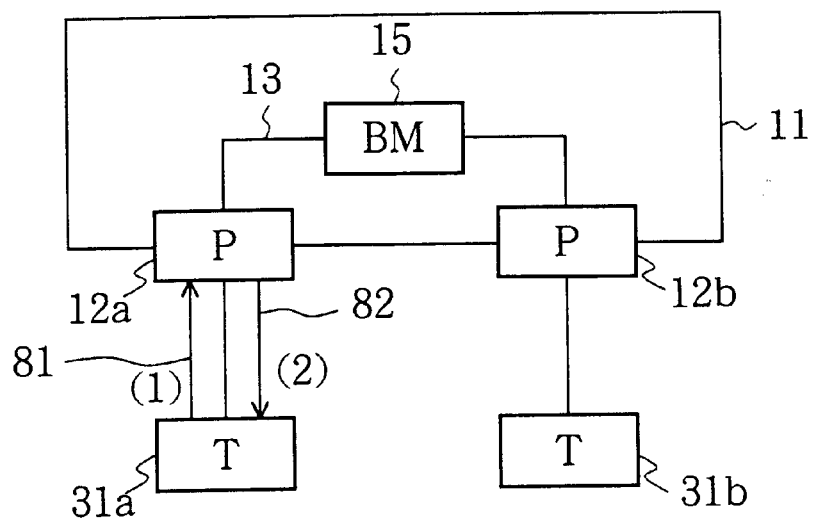
FIG. 12 is a block diagram illustrating operations of respective portions of the serial bus network shown in FIG. 11 when a terminal device sends the asynchronous packet.

FIG. 12 shows operations of respective portions of the serial bus network shown in FIG. 11 when the terminal device 31a of the serial bus network transmits the asynchronous packet.

As shown in FIG. 12, (1) the terminal device 31a transmits a transmission request 81 to the portal 12a according to the procedure defined by, for example, the IEEE 1394.1995, and (2) the portal 12a which receives the transmission request 81 transmits a transmission permission 82 to the terminal device 31a and the terminal device 31a which receives the transmission permission 82 transmits the asynchronous packet to a local bus.

Figure 13:
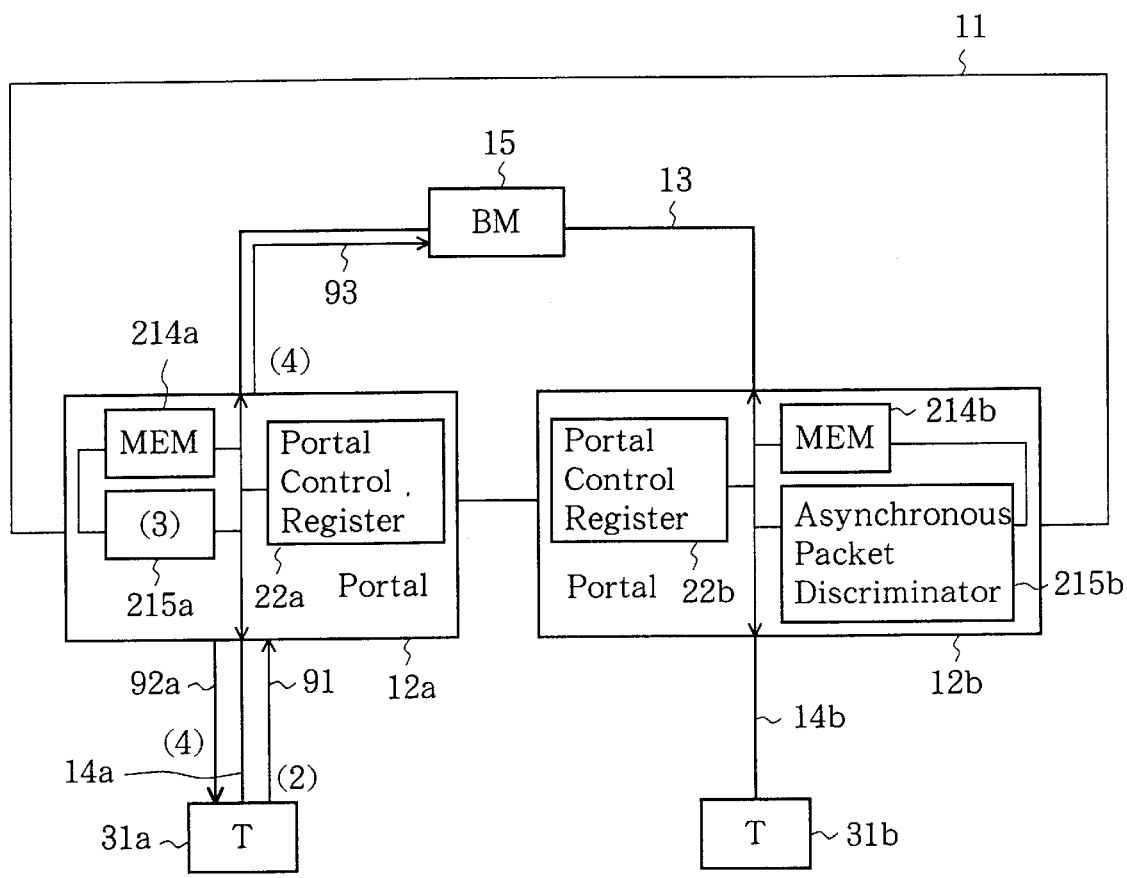
FIG. 13 is a block diagram illustrating operations of the respective portions of the serial bus network shown in FIG. 11 when a portal receives the asynchronous packet sent by the terminal device.

FIG. 13 shows operations of respective portions of the serial bus network shown in FIG. 11 when the portal 12a receives the asynchronous packet 91 transmitted by the terminal device 31a of the serial bus network.

As shown in FIG. 13, (3) the asynchronous packet discriminator 215 of the portal 12a reads the bus_ID of the destination described in the destination_ID field 61 of the received asynchronous packet 91, and (4) when the bus_ID read in (3) is different from the bus_ID of the local bus 14a connected to the portal 12a or indicates that the packet is a multi address packet, that is, the packet to be sent to all terminal devices connected to the serial bus network (the bus_ID is, for example, "3FF" in hexadecimal notation which is the value defined by the IEEE 1394.1995), the portal 12a transmits a transmission request 93 to the bridge manager 15 and stores the received asynchronous packet 91 in its memory 214a. The memory 214a is substantially the same as the previously mentioned memory 214.

The portal 12a transmits a transmission confirmation signal 92b including, for example, a pending code defined by the IEEE 1394.1995 for confirming a transmission of the transmission request to the local bus 14a.

Figure 14:
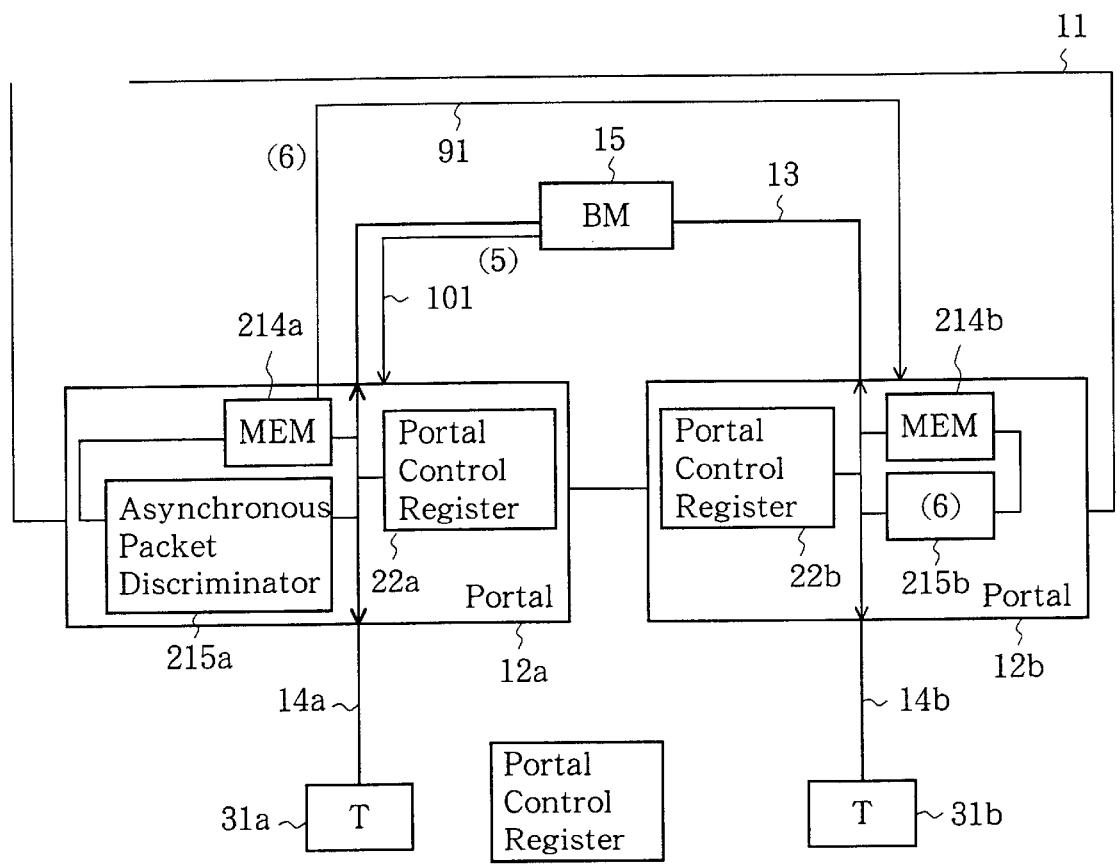
FIG. 14 is a block diagram illustrating operations of the respective portions of the serial bus network shown in FIG. 11 when a portal sends the asynchronous packet onto a bridge bus.

FIG. 14 shows operations of respective portions of the serial bus network shown in FIG. 11 when the portal 12a transmits the asynchronous packet 91 to the bridge bus 13 of the serial bus network.

As show in FIG. 14, (5) the bridge manager 15 which receives the transmission request 93 transmits a transmission permission 101 to the portal 12a, and (6) the portal 12a which receives the transmission permission 101 from the bridge manager 15 transmits the asynchronous packet 91 stored in the memory 214a to the bridge bus 13. The portal 12b receives the asynchronous packet 91 transmitted by the portal 12a, from the bridge bus 13. The asynchronous packet discriminator 215b of the portal 12b reads the content of a destination_bus_ID field 61 of the received asynchronous packet 91 and, when the bus_ID described in the destination_bus_ID field 61 substantially coincides with the bus_ID of the local bus 14b connected to the portal 12b or indicates that the received asynchronous packet 91 is a multi address packet, the received asynchronous packet 91 is stored in the memory 214b of the portal 12b.

Figure 15:
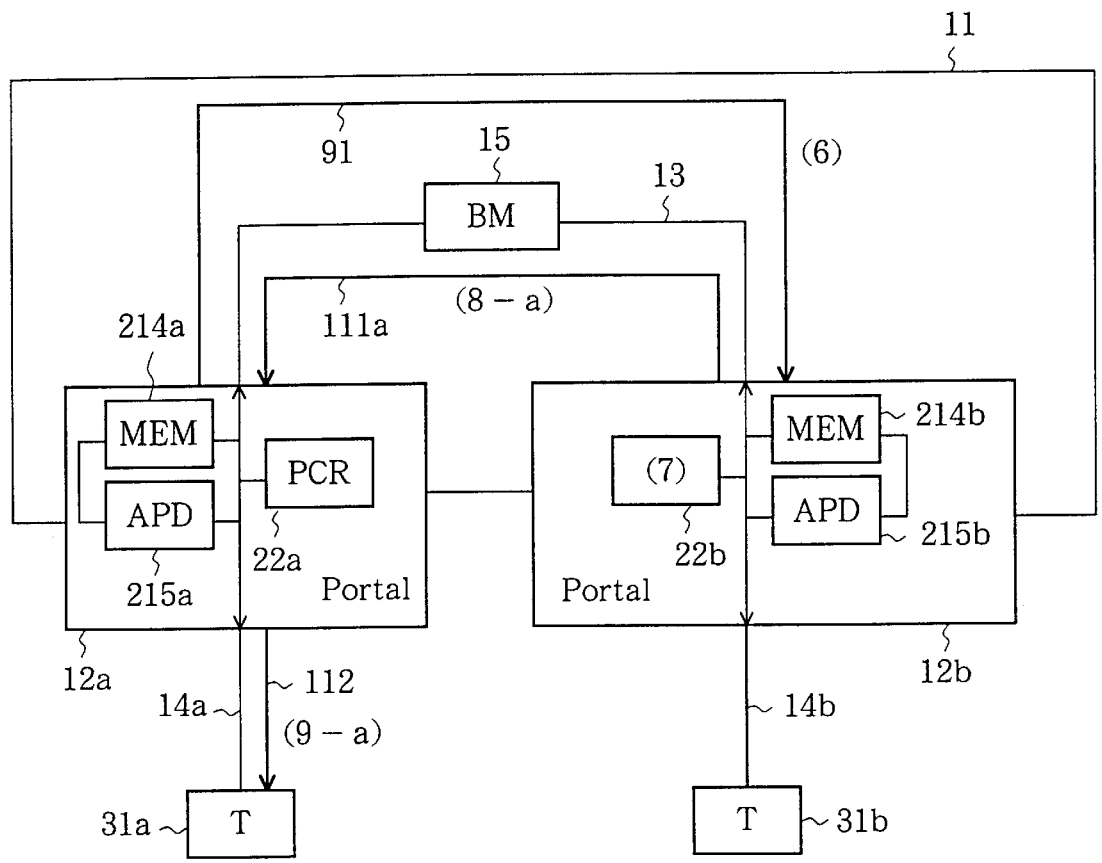
FIG. 15 is a block diagram illustrating operations of the respective portions of the serial bus network shown in FIG. 11 in a case where a value of a portal control register is 0 when the portal receives the asynchronous packet from the bridge bus.
Figure 16:
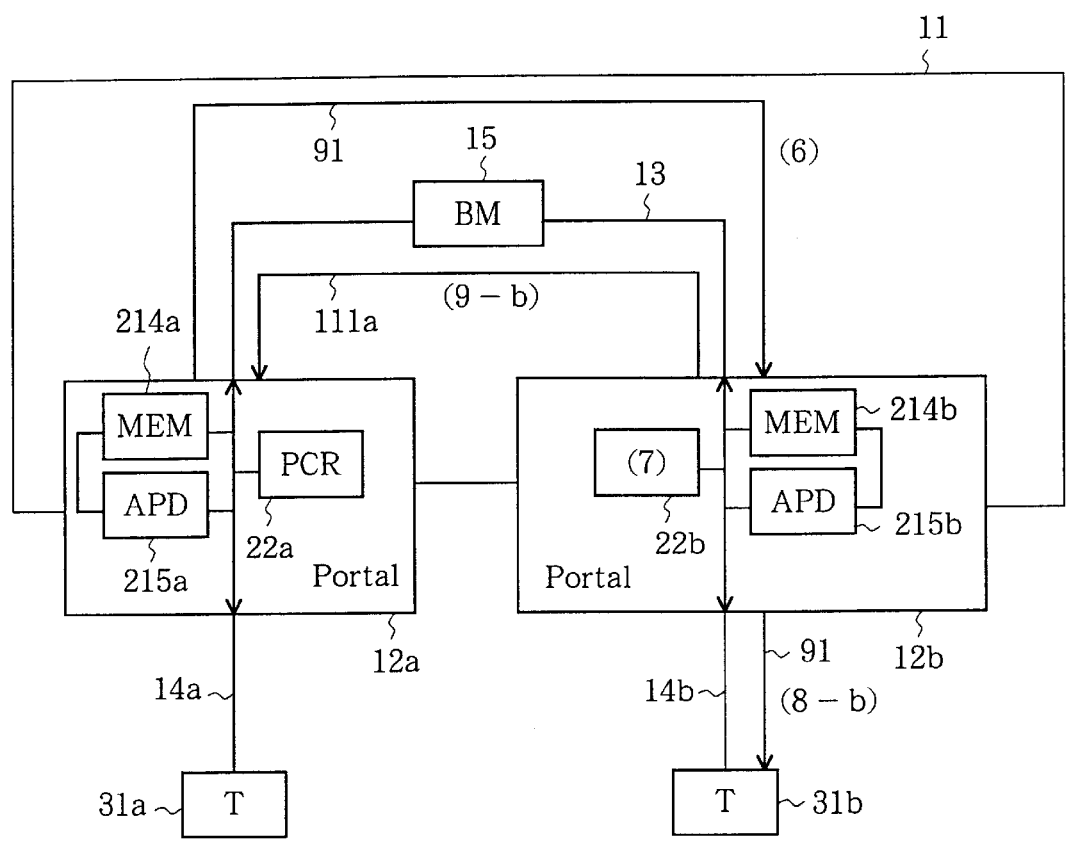
FIG. 16 is a block diagram illustrating operations of the respective portions of the serial bus network shown in FIG. 11 in a case where a value of a portal control register is not 0 when the portal receives the asynchronous packet from the bridge bus.

FIGS. 15 and 16 show operations of respective portions of the serial bus network shown in FIG. 11 when the portal 12b receives the asynchronous packet 91 from the bridge bus 13 of the serial bus network.

As shown in FIGS. 15 and 16, (7) when the portal 12b confirms that the bus_ID of the local bus 14b coincides with the bus_ID described in the destination_bus_ID field 61, received in the asynchronous packet 91, the portal 12b reads the value of the portal control register 22b thereof.

Then, as shown in FIG. 15, (8-a) when the value of the portal control register 22b of the portal 12b is 0, the portal 12b transmits a transmission confirmation signal 111a for confirming the transmission of the asynchronous packet 91, including, for example, an address error code defined by the IEEE 1394.1995 to the bridge bus 13 and cancels the packet stored in the memory 214b thereof, (9-a) the portal 12a which receives the transmission confirmation signal 111a from the bridge bus 13 cancels the asynchronous packet 91 stored in the memory 214a thereof and transmits a transmission confirmation signal 112 for confirming the transmission of the synchronous packet 91, including, for example, an address error code defined by the IEEE 1394.1995 to the local bus 14a.

The terminal device 31a which receives the transmission confirmation signal 112 repeats the transmission procedure of the asynchronous packet 91 from the procedure (1).

On the other hand, as shown in FIG. 16, (8-b) when the value of the portal control register 22b of the portal 12b is not 0, the portal 12b transmits the asynchronous packet 91 stored in the memory 214b to the local bus 14b, and (9-b) the portal 12b transmits a transmission confirmation signal 111b including the pending code indicative of a continuation of the transmission procedure to the bridge bus 13. The portal 12a which receives the transmission confirmation signal 111b from the portal 12b cancels the asynchronous packet 91 stored in the memory 214a thereof.

Figure 17:
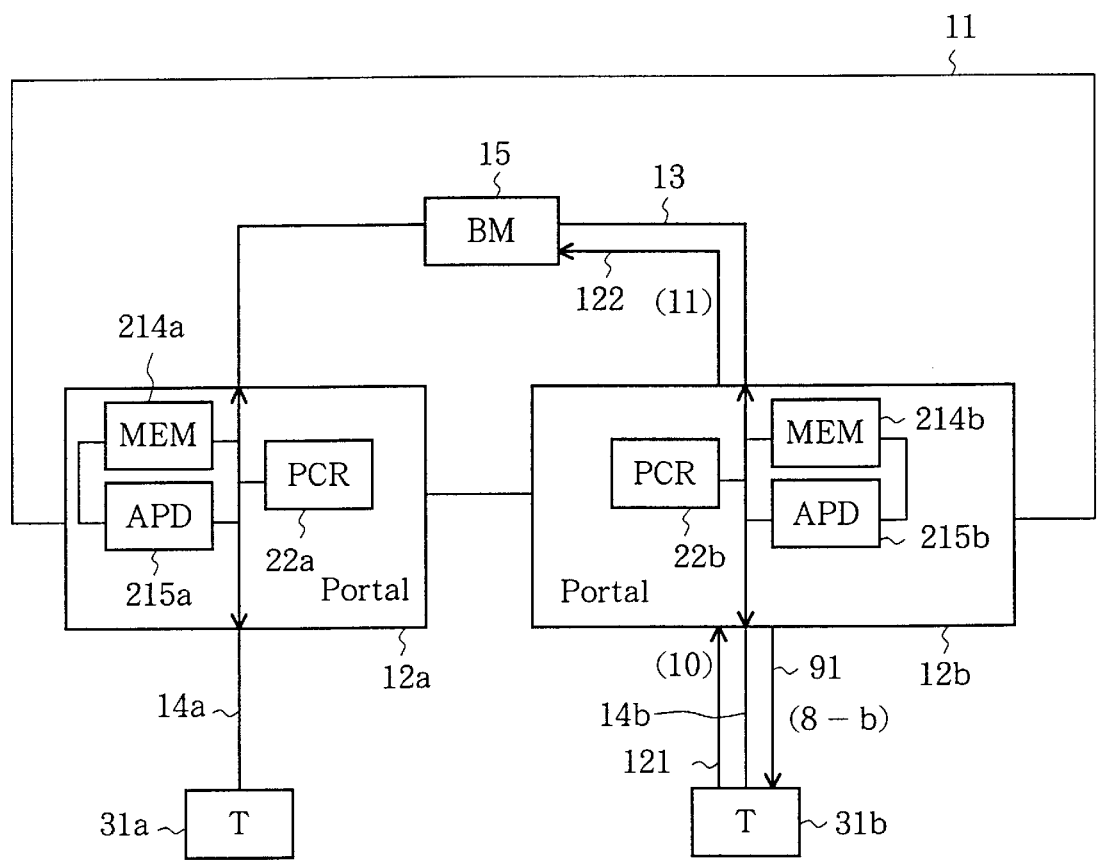
FIG. 17 is a block diagram illustrating operations of the respective portions of the serial bus network shown in FIG. 11 when the terminal device receives the asynchronous packet.

FIG. 17 shows operations of respective portions of the serial bus network shown in FIG. 11 when the terminal device 31b receives the asynchronous packet 91 from the bridge bus 13 of the serial bus network.

As show in FIG. 17,

(10) when the terminal device 31b receives the asynchronous packet 91 sent thereto, the terminal device 31b transmits a transmission confirmation signal 121 to the local bus 14b, and

(11) the portal 12b which receives the transmission confirmation signal 121 from the terminal device 31b, the portal 12b transmits a transmission request 122 to the bridge manager 15.

Figure 18:
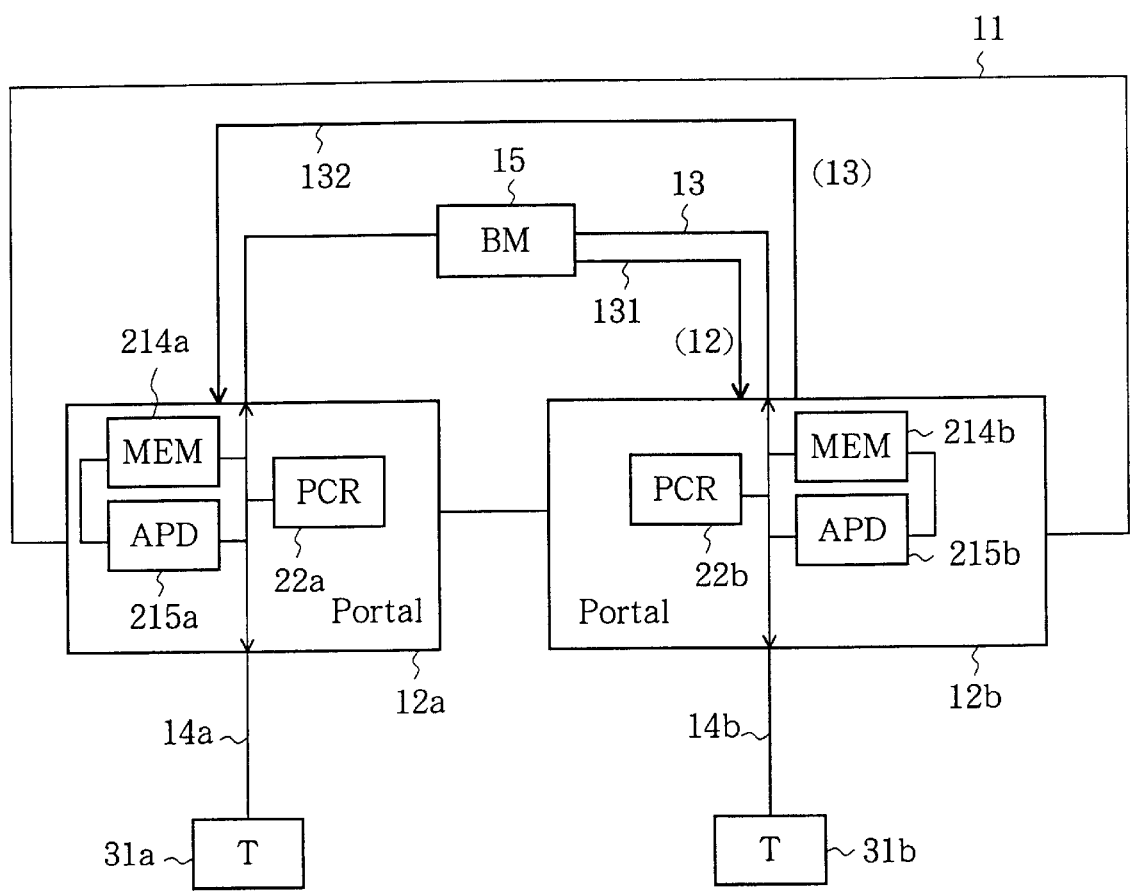
FIG. 18 is a block diagram illustrating operations of the respective portions of the serial bus network shown in FIG. 11 when the portal acquires a transmission permission from a bridge manager.

FIG. 18 shows operations of respective portions of the serial bus network shown in FIG. 11 when the portal 12b obtains a transmission permission 131 from the bridge manager 15 in the serial bus network.

As show in FIG. 18,

(12) the bridge manager 15 which receives the transmission request 122 from the portal 12b transmits a transmission permission 131 to the portal 12b, and

(13) the portal 12b which receives the transmission permission 131 from the bridge manager 15 reads the content, that is, an information identifying the transmitting side, of a source_ID field 62 contained in the asynchronous packet 91 stored in the memory 214b thereof, produces an asynchronous packet (no data) 132 having a destination_ID field 61 in which the content of the thus read source_ID field 62 is described and transmits the asynchronous packet 132 to the bridge bus 13. Then, the portal 12b cancels the asynchronous packet 91 stored in the memory 214b thereof and, instead thereof, stores the asynchronous packet (no data) 132 in the memory 214b.

Figure 19:
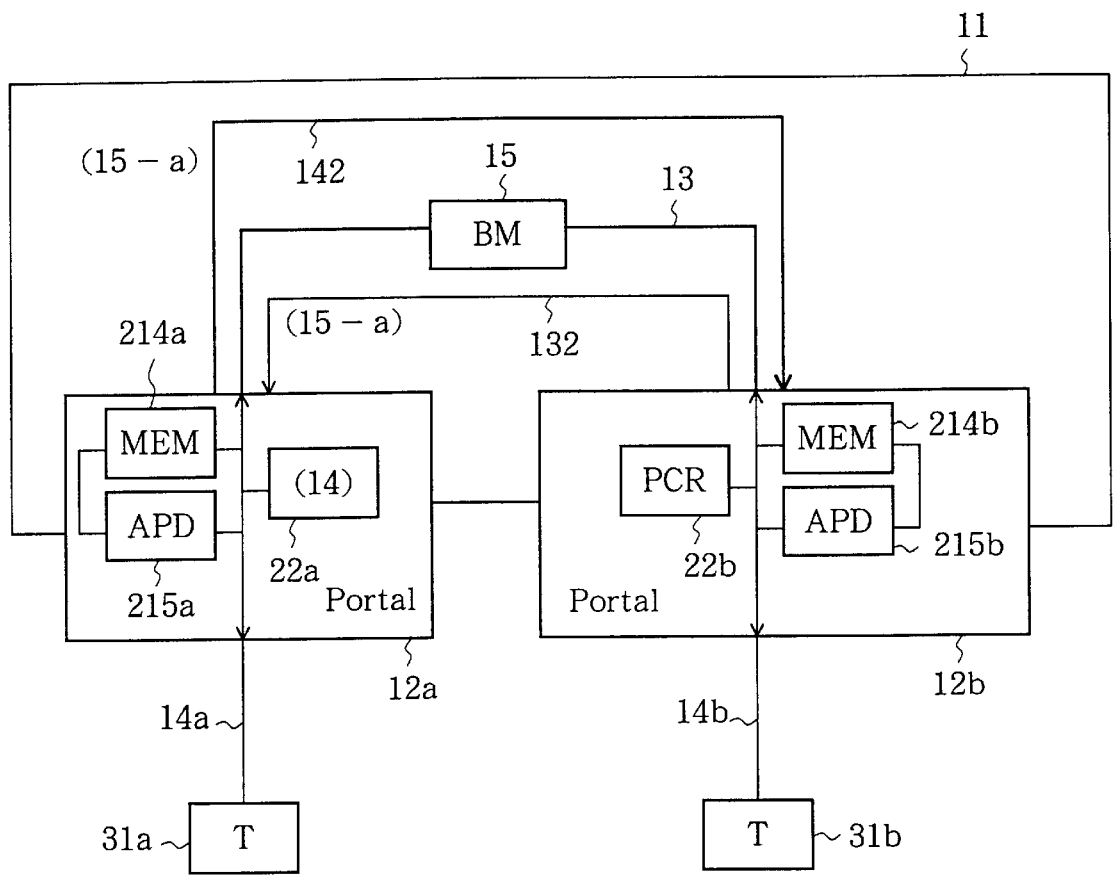
FIG. 19 is a block diagram illustrating operations of the respective portions of the serial bus network shown in FIG. 11 in a case where the value of the portal control register is 0 when the portal receives an asynchronous packet (no data)
Figure 20:
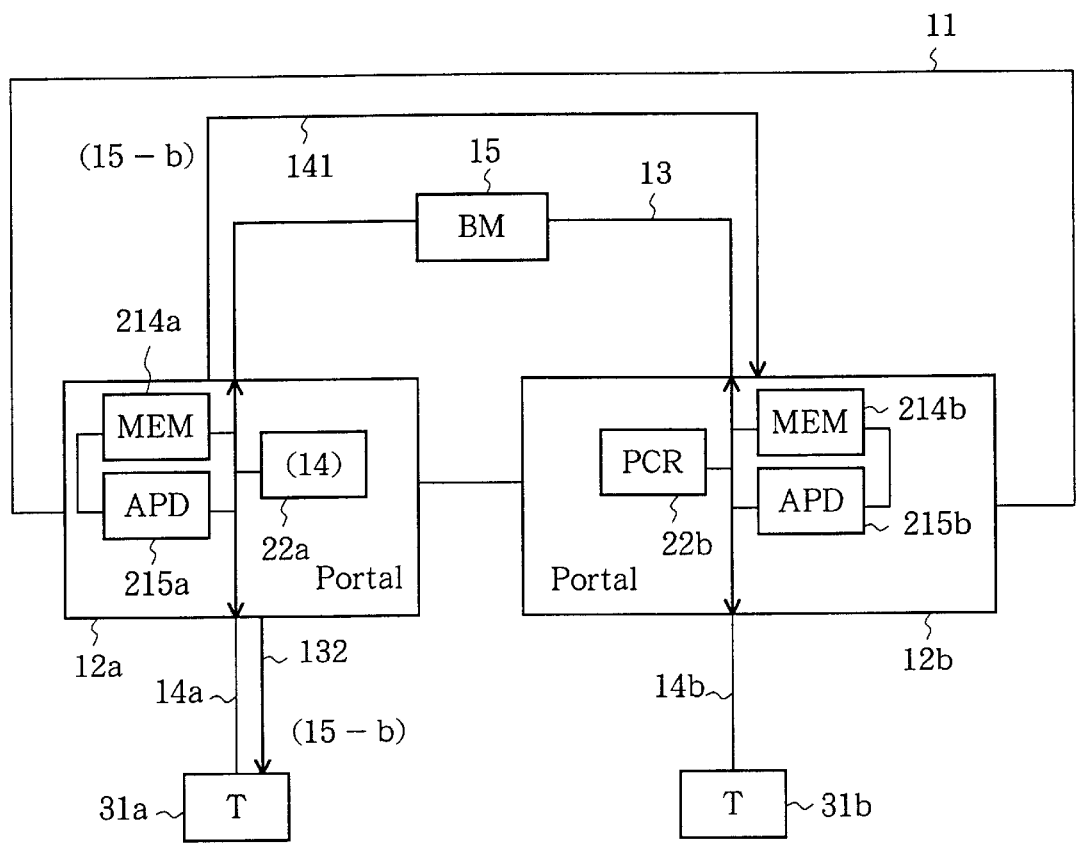
FIG. 20 is a block diagram illustrating operations of the respective portions of the serial bus network shown in FIG. 11 in a case where the value of the portal control register is not 0 when the portal receives an asynchronous packet (no data)

FIGS. 19 and 20 show operations of respective portions of the serial bus network shown in FIG. 11 when the portal 12a receives the asynchronous packet (no data) 132 from the bridge bus 13 of the serial bus network.

As shown in FIGS. 19 and 20,

(14) when the portal 12a receives the asynchronous packet (no data) 132 transmitted from the portal 12b, the asynchronous packet discriminator 215a of the portal 12a reads the content of the destination_ID field 61 of the asynchronous packet (no data) 132. When the value of the bus_ID contained in the thus read content coincides with the value indicated by the local bus 14a, the portal 12a stores the received asynchronous packet (no data) 132 in its memory 214a. Thereafter, the portal 12a reads the value stored in the portal control register 22a and decides whether or not its value is 0.

And, as shown in FIG. 19, (15-a) when the value stored in the portal control register 22a is 0, the portal 12a sends a transmission confirmation signal 142 including a rewrite code to the bridge bus 13. After the portal 12b receives the transmission confirmation signal 142, transmits the transmission request to the bridge manager 15 and receives the transmission permission from the bridge manager 15, the portal 12b sends the asynchronous packet (no data) 132 stored in the memory 214b to the bridge manager 13 again.

Further, as shown in FIG. 20, (15-b) when the value stored in the portal control register 22a is not 0, the portal 12a sends the transmission confirmation signal 141 to the bridge bus 13 and sends the asynchronous packet (no data) 132 stored in the memory 214a to the local bus 14a. The portal 12b receives the transmission confirmation signal 141 and cancels the asynchronous packet (no data) 132 stored in the memory 214b.

Figure 21:
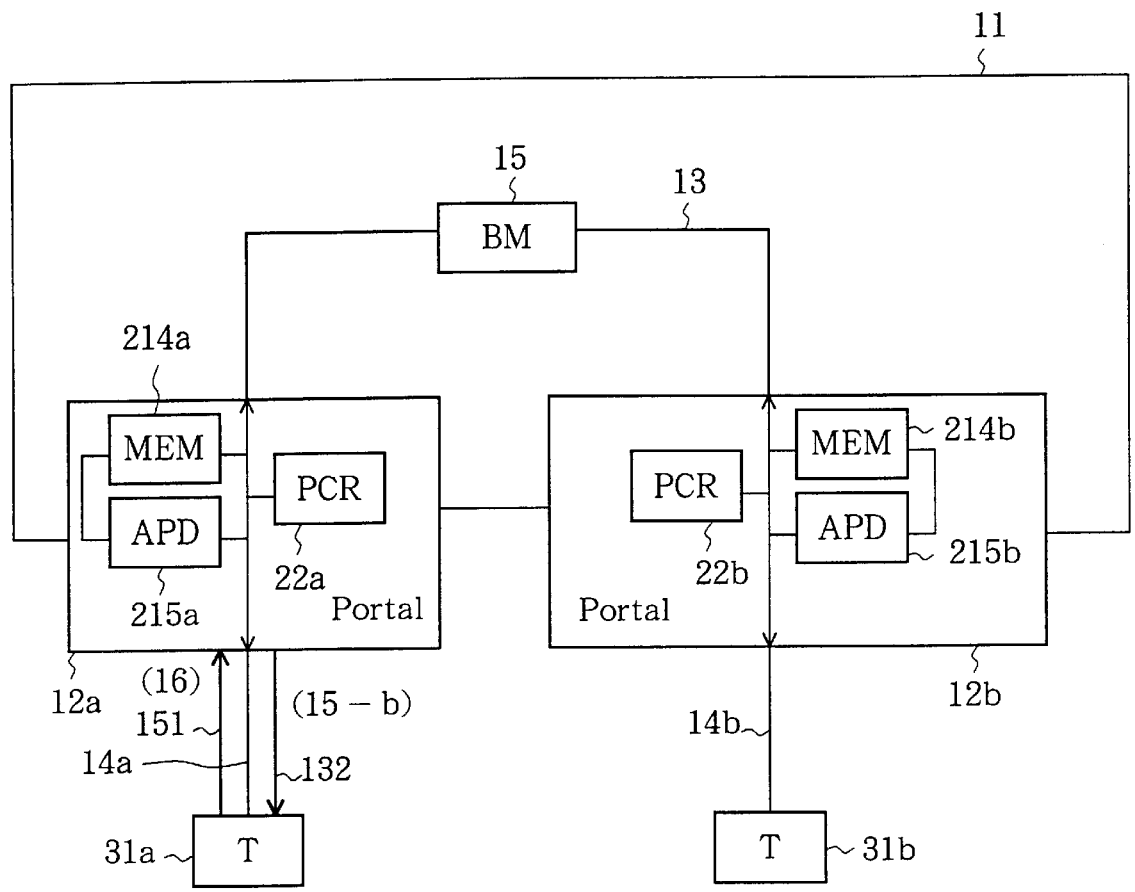
FIG. 21 is a block diagram illustrating operations of the respective portions of the serial bus network shown in FIG. 11 when the terminal device receives an asynchronous packet (no data)

FIG. 21 shows operations of respective portions of the serial bus network shown in FIG. 11 when the terminal device 31a receives the asynchronous packet (no data) 132 from the bridge bus 13 of the serial bus network.

As shown in FIG. 21,

(16) when the terminal device 31a receives the asynchronous packet (no data) 132 sent by the portal 12a, the terminal device 31a sends a transmission confirmation signal 151 to the local bus 14a. When the portal 12a receives the transmission confirmation signal 151, it cancels the asynchronous packet (no data) 132 stored in the memory 214a.

The communication procedures complete through the above mentioned steps (1) to (16) and the asynchronous packet is transmitted from the terminal device 31a through the IEEE 1394 bridge 11 to the terminal device 31b.

[Isochronous Packet Communication Procedures]

After the initialization of the serial bus network and the definition of topology are completed, it becomes possible to exchange not only asynchronous packet but also isochronous packet between the terminal devices connected to the serial bus network.

A terminal device which is trying to send an isochronous packet on a local bus to which it is connected requests a portal which is the IRM of the local bus an isochronous resource. The isochronous resource management of the serial bus network is performed for every local bus by the portal which is the IRM of the local bus. That is, a state of resource of one local bus is not influenced by states of resources of other local buses.

When an isochronous communication is performed between terminal devices connected to different local buses, the isochronous packet is transferred between portals connected to the local buses to which the terminal devices are connected, through the bridge bus.

As to the transfer of isochronous packets, the following two cases are considered:

(Case 1) Isochronous resources for a terminal device are already secured on a local bus, the terminal device is transmitting an isochronous packet and a terminal device connected to a local bus different from that to which the terminal device is connected receives the transmitted isochronous packet; and (Case 2) After a terminal device (source terminal) which tries a transmission of an isochronous packet to a terminal device (destination terminal) connected to a local bus different from that to which the source terminal device is connected decides the transmission of the packet, isochronous resources of the local buses to which the transmitting and receiving terminal devices are connected and the bridge bus are acquired.

A communication procedure of an isochronous packet in the above mentioned case 1 will be described with reference to FIGS. 22 to 33 by taking, as an example, a case where the terminal device 31b receives an isochronous packet transmitted by the terminal device 31a under condition that the terminal device 31a already acquired the isochronous resource on the local bus 14a, transmits the isochronous packet and is communicating with the portal 12a in the serial bus network shown in FIG. 11. Incidentally, it is assumed that the terminal device 31a acquired the isochronous resource on the local bus 14a according to the procedures defined by, for example, the IEEE 1394.1995.

Figure 22:
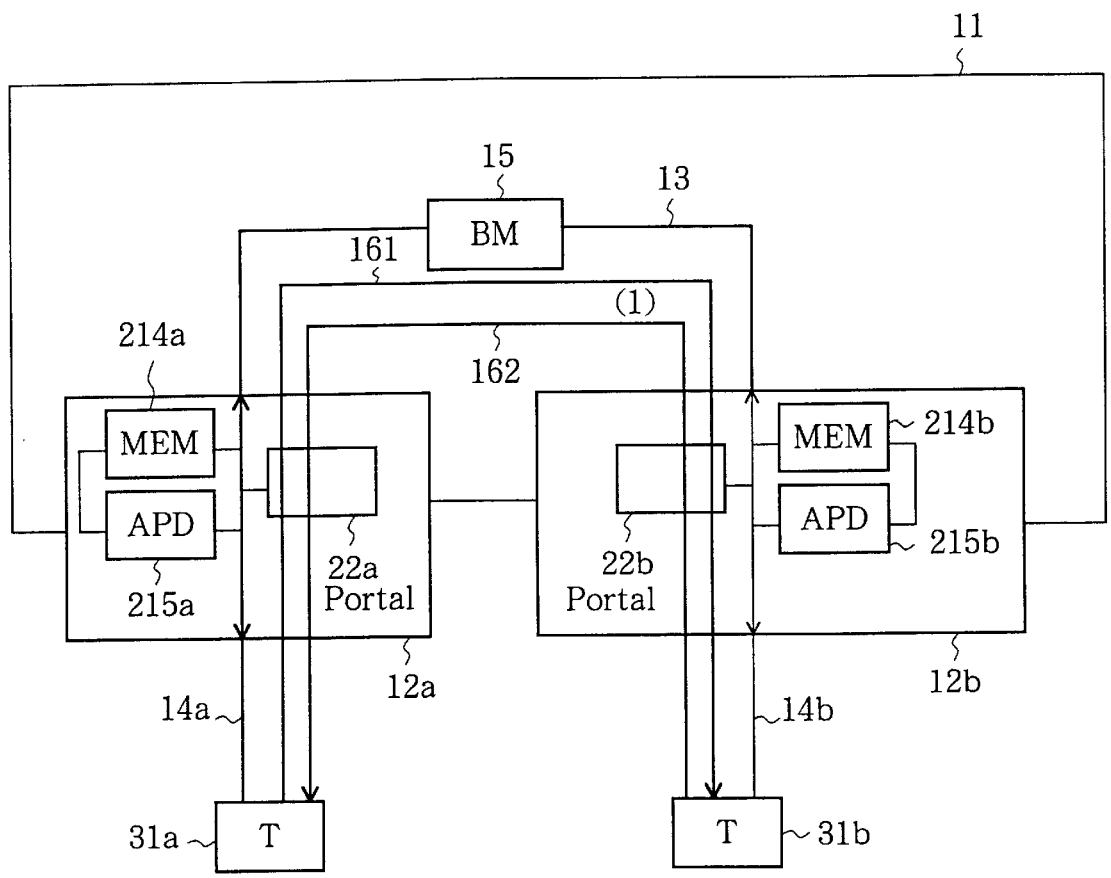
FIG. 22 is a block diagram illustrating operations of the respective portions of the serial bus network shown in FIG. 11 when the terminal device inquires a portal an isochronous resource.

FIG. 22 shows operations of respective portions of the serial bus network shown in FIG. 11 when the terminal device 31b inquires the terminal device 31a of the bus resource which was secured on the local bus 14a by the terminal device 31a.

As shown in FIG. 22, (1) the terminal device 31b inquires the terminal device 31a of information indicative of the isochronous resource acquired on the local bus by the terminal device 31a, by using an asynchronous packet.

In concrete, the terminal device 31b performs a read transaction (data read) 161 from the oPCR of the terminal device 31a through the portals 12a and 12b according to, for example, the procedures defined by the IEEE 1394–1995. The terminal device 31b receives a read response 162 from the terminal device 31a. The terminal device 31b acquires information indicative of a channel occupied on the local bus 14a by the terminal device 31a and its bandwidth, that is, information indicative of the isochronous resource, from the received read response 162.

The read response 162 is transferred through the portals 12a and 12b to the terminal device 31b in the format of the asynchronous packet. When the portals 12a and 12b receive the packet, the asynchronous packet discriminators 215a and 215b discriminate the destination thereof by reading the content of the destination_ID field 61 of the packet and the portals 12a and 12b transfer the packet to the discriminated destination according to the above mentioned asynchronous packet communication procedure.

Figure 23:
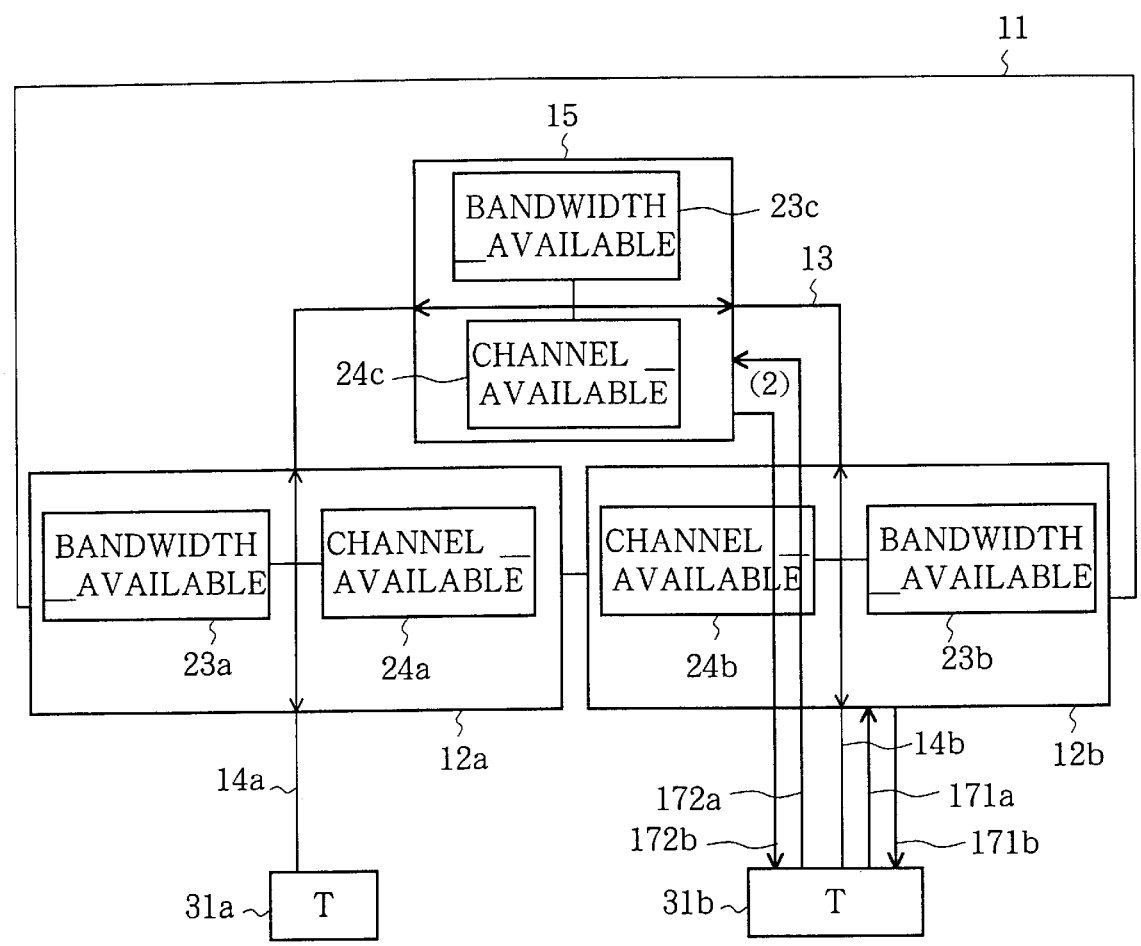
FIG. 23 is a block diagram illustrating operations of the respective portions of the serial bus network shown in FIG. 11 when the terminal device inquires an isochronous resource information of the local bus and the bridge bus.

FIG. 23 shows operations of respective portions of the serial bus network shown in FIG. 11 when the terminal device 31b inquires the portal 12b of a resource information of the local bus 14b and the bridge bus 13.

As shown in FIG. 23, (2) the terminal device 31b inquires the portal 12b which is the IRM of the local bus 14b of an available isochronous resource on the local bus 14b and inquires the bridge manager 15 which is the IRM of the bridge bus 13 of an available isochronous resource on the bridge bus 13.

In concrete, the terminal device 31b performs a quadlet read transaction (data read) 171a with respect to the portal 12b by using the asynchronous packet and receives a read response 171b containing the values of the BANDWIDTH_AVAILABLE register 23b and the CHANNEL_AVAILABLE register 24b of the portal 12b, which are acquired by the read response 171b. The terminal device 31b performs a quadlet read transaction 172a with respect to the bridge manager 15 by using the asynchronous packet and receives a read response 172b containing the values of the BANDWIDTH_AVAILABLE register 23c and the CHANNEL_AVAILABLE register 24c of the bridge manager 15, which are acquired by the read response 172b.

Figure 24:
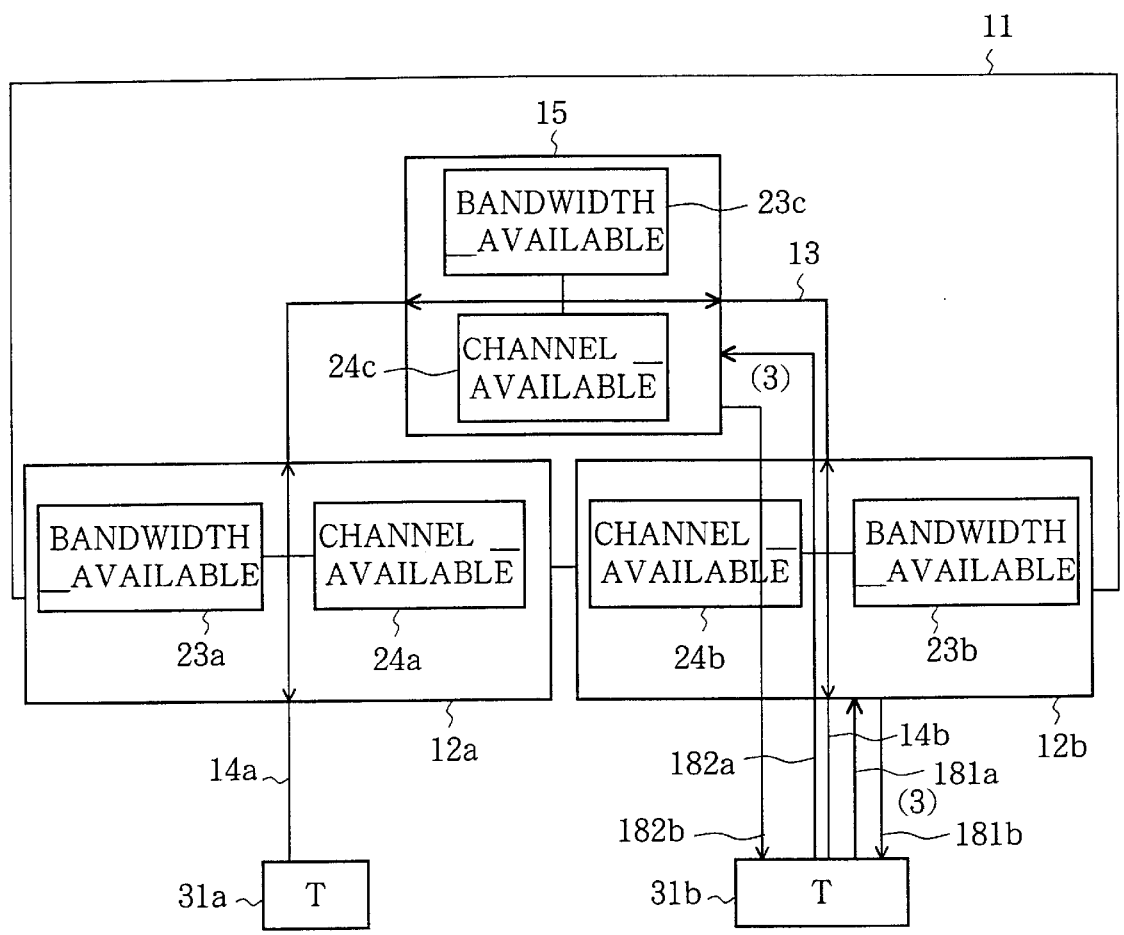
FIG. 24 is a block diagram illustrating operations of the respective portions of the serial bus network shown in FIG. 11 when the terminal device acquires an isochronous resource of the local bus and the bridge bus.

FIG. 24 shows operations of respective portions of the serial bus network shown in FIG. 11 when the terminal device 31b acquires the resource information on the local bus 14b and the bridge bus 13.

As shown in FIG. 24, (3) the terminal device 31b compares the information which is obtained by the procedure (2) and indicative of the isochronous resources usable on the portal 12b and the bridge manager 15 with the information which is obtained by the procedure (1) and indicative of the isochronous resource secured on the local bus 14a by the terminal device 31a and determines whether or not the terminal device 31a can acquire an isochronous resource on the local bus 14b and the bridge bus 13, which is similar to the isochronous resource secured on the local bus 14b by the terminal device 31a.

When the terminal device 31b decides that the terminal device 31a can acquire an isochronous resource on the local bus 14b and the bridge bus 13, which is similar to the isochronous resource secured on the local bus 14b by the terminal device 31a, the terminal device 31b secures the isochronous resource by performing a lock transaction 181a to the portal 12b which is the IRM of the local bus 14b. In concrete, the terminal device 31b operates (compares & swaps) to update portions of the contents of the BANDWIDTH_AVAILABLE register 23b and the CHANNEL_AVAILABLE register 24b which are different from the information indicative of the isochronous resource obtained by the procedure (1) by using the asynchronous packet, according to, for example, the procedures defined by the IEEE 1394.1995.

Further, the terminal device 31b secures the isochronous resource by performing a lock transaction 182a with respect to the bridge manager 15 which is the IRM of the bridge bus 13. In concrete, the terminal device 31b updates portions of the contents of the BANDWIDTH_AVAILABLE register 23c and the CHANNEL_AVAILABLE register 24c, which are different from the information indicative of the isochronous resource obtained by the procedure (1), through a similar procedure to that in the lock transaction 181a.

After the terminal device 31b secures the isochronous resource, the terminal device 31b receives lock responses 181b and 182b from the portal 12b and the bridge manager 15.

Incidentally, when it is judged that it is impossible to secure a similar isochronous resource on the local bus 14b and the bridge bus 13 to that on the local bus 14a, the terminal device 31b does not request any isochronous resource.

Figure 25:
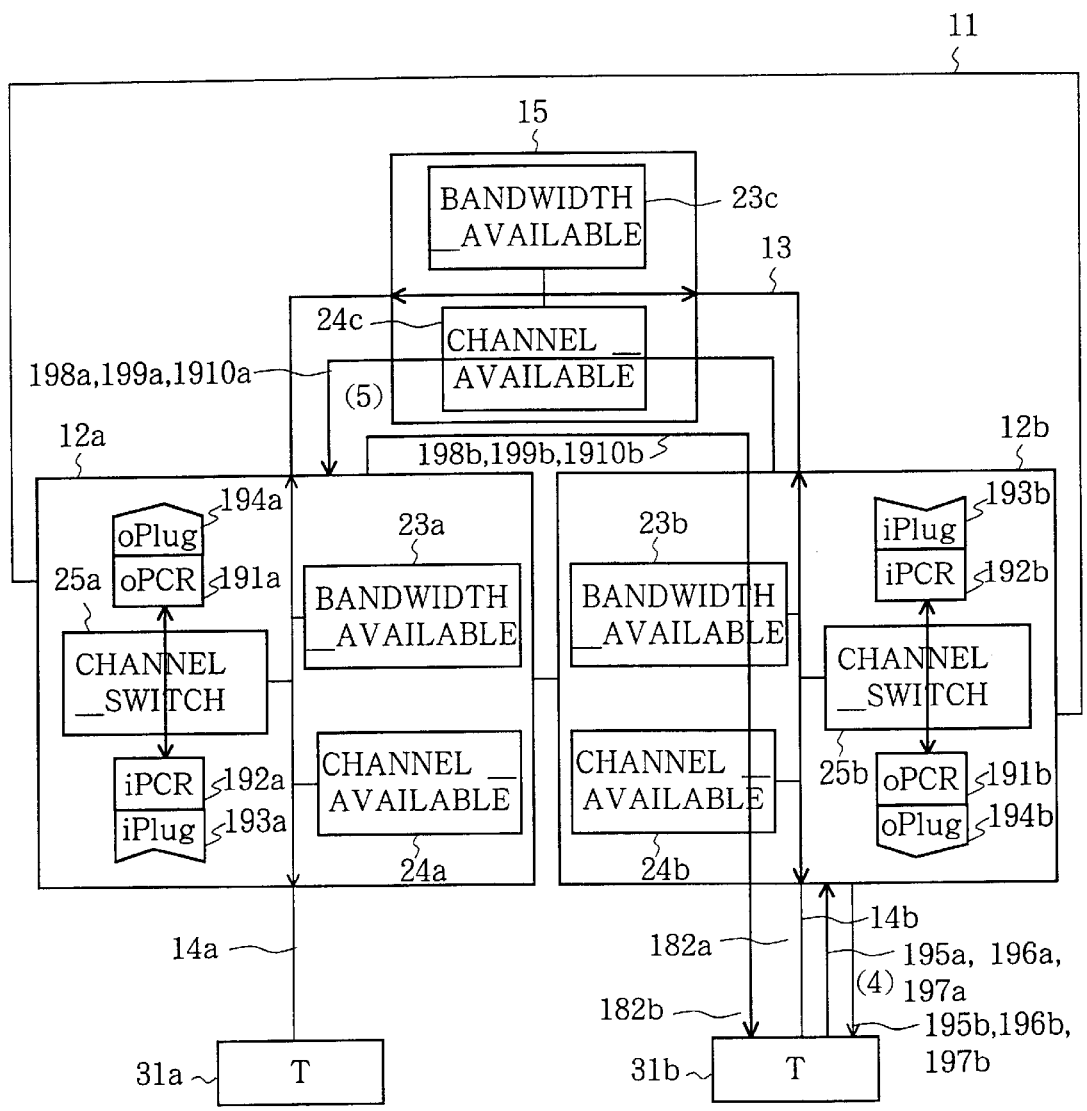
FIG. 25 is a block diagram illustrating operations of the respective portions of the serial bus network shown in FIG. 11 when a plug of a portal is related to an isochronous channel on a bus held for the terminal device.

FIG. 25 shows operations of respective portions of the serial bus network shown in FIG. 11 when an isochronous channel secured by the terminal device 31b is to be associated with plugs of the portals 12a and 12b.

As shown in FIG. 25, (4) the terminal device 31b performs a write transaction (data write) 195a with respect to an oPCR 191b of the portal 12b on the side of the local bridge by using an asynchronous packet according to, for example, the procedure defined by the IEEE 1394.1995, in order to associate the isochronous channel secured on the local bus 14b with an oPlug 194b.

Thereafter, when the terminal device 31b receives a write response 196b from the portal 12b, the terminal device 31b further performs a write transaction 197a with respect to the CHANNEL_SWITCH register 25b of the portal 12b, in order to associate an iPlug 193b with an oPlug 194b.

(5) When the terminal device 31b receives a write response 197b from the portal 12b after the procedure (4), the terminal device 31b performs a write transaction 198a similar to the write transaction 196a in the procedure (4) with respect to the portal 12a. With this, the terminal device 31b mutually associates an iPlug 193a on the local bus side of the portal 12a with the isochronous channel secured on the local bus 14a by the terminal device 31a.

Further, in response to the write response 197b from the portal 12b, the terminal device 31b performs a write transaction 199a with respect to the portal 12a. With this write transaction, the terminal device 31b mutually associates an oPlug 194a of the portal 12a with the isochronous channel secured on the local bus 14a by the terminal device 31b.

Thereafter, in response to the write responses 198b and 199b transmitted from the portal 12a in response to the write transactions 198a and 199a, the terminal device 31b performs a write transaction 1910a with respect to the CHANNEL_SWITCH register 25a of the portal 12a. With this transaction, the terminal device 31b associates an iPlug 193a with an oPlug 194a.

After the terminal device 31b performs the write transaction 1910a, it receives a write response 1910b from the portal 12a.

Through the above described procedures (1) to (5), the terminal device 31a can receive the isochronous packet sent from the terminal device 31b.

Incidentally, in the procedure (1), it is unnecessary for the terminal device 31b to inquire of the terminal device 31a the isochronous resource occupied on the local bus 14a by the terminal device 31a and the terminal device 31b may inquire of the portal 12a the same resource.

Figure 26:
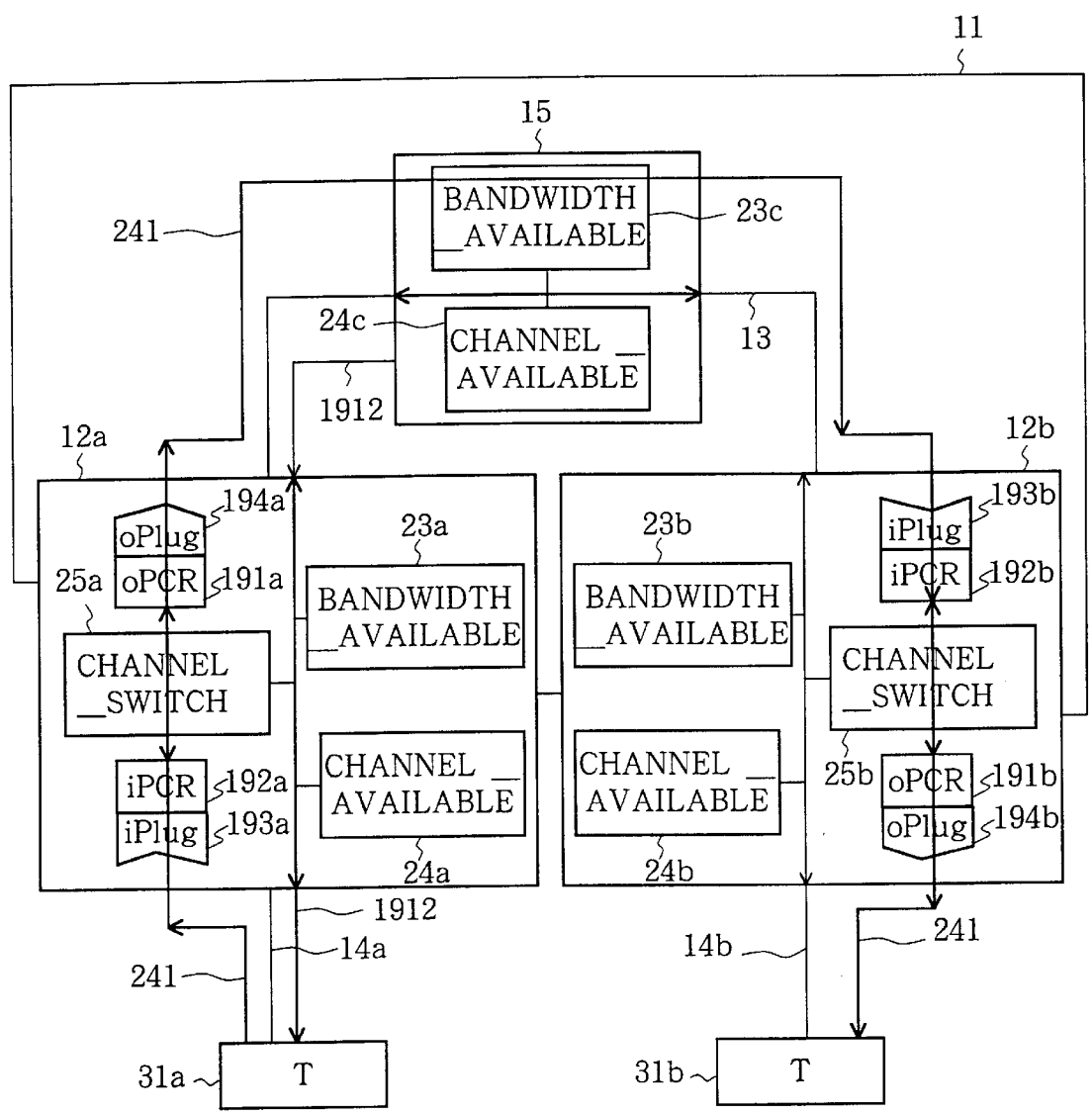
FIG. 26 shows a concrete How of the isochronous packet.

FIG. 26 shows a concrete flow of an isochronous packet 1911 in the serial bus network shown in FIG. 11.

As shown in FIG. 26, the bridge manager 15 sends a cycle start packet 1912 to the bridge bus 13. The portal 12a receives the cycle start packet 1912 and transfers the latter to the local bus 14a. When the terminal device 31a receives the cycle start packet 1912 transferred to the local bus 14a, the terminal device 31a sends the isochronous packet 1911. Then, the portal 12a receives the isochronous packet 1911 sent onto the local bus 14a through the iPlug 193a, and the portal 12a sends the isochronous packet 1911 onto the isochronous channel secured on the bridge bus 13 through the oPlug 194a according to the content of the CHANNEL_SWITCH register 25a.

The isochronous packet 1911 sent to the same isochronous channel on the bridge bus 13 is received by the portal 12*b* through the iPlug 193*b*. The portal 12*b* sends the received isochronous packet 1911 to the isochronous channel secured on the local bus 14*b* through the oPlug 194*b* according to the content of the CHANNEL_SWITCH register 25*b*. The terminal device 31*b* receives the isochronous packet 1911 sent to the isochronous channel.

Next, the communication procedure of the isochronous packet in the previously mentioned case (2) when the terminal device 31*a* inquires of the portal 12*b* the isochronous resource will be described with reference to FIGS. 27 to 29.

Figure 27:
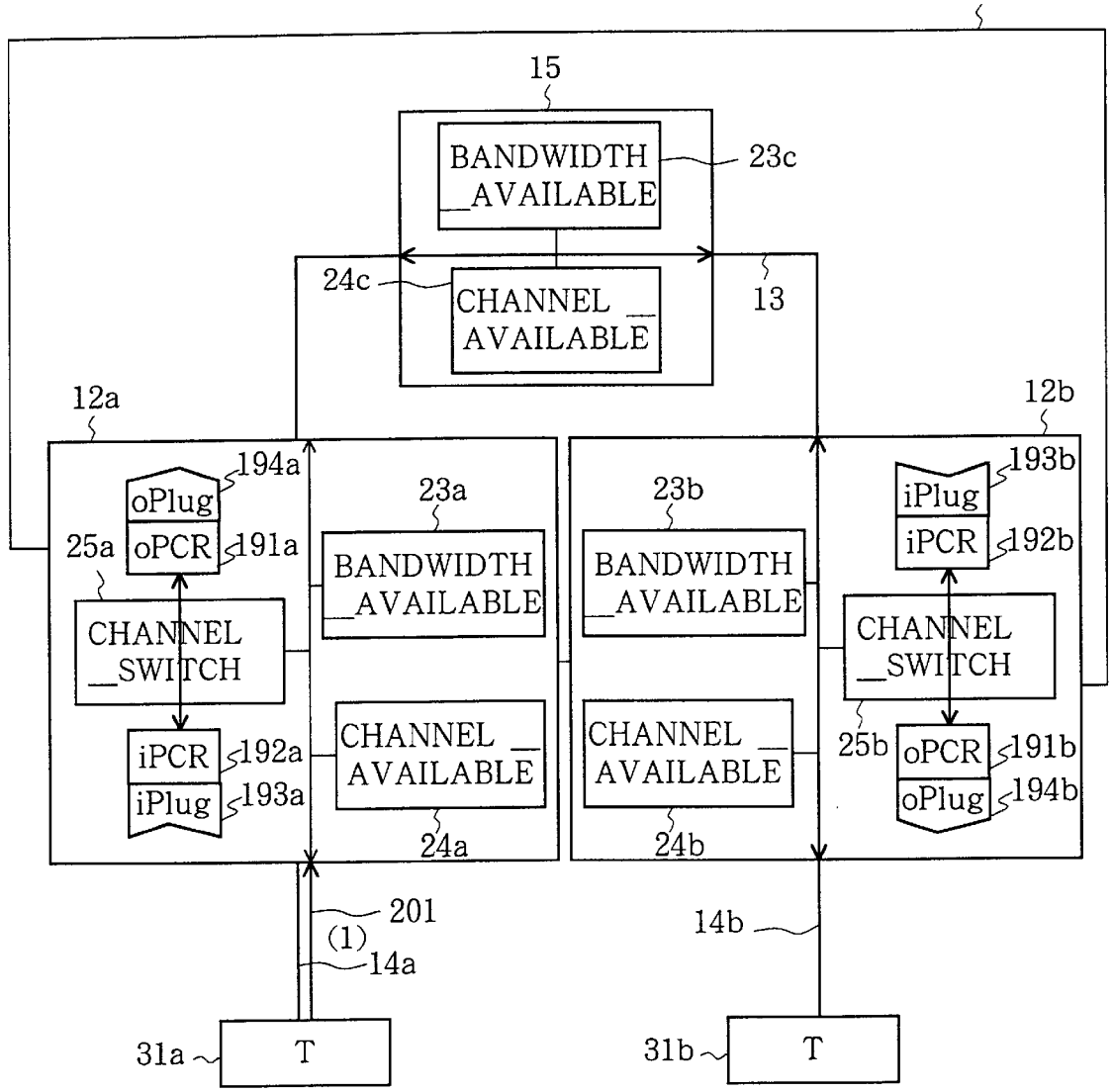
FIG. 27 is a block diagram illustrating operations of the respective portions of the serial bus network shown in FIG. 11 when the terminal device inquires a resource.

As shown in FIG. 27,
(1) the terminal device 31*a* inquires of the portal 12*a* which is the IRM of the local bus 14*a* to which the terminal device 31*a* is connected an available isochronous resource, prior to a sending of the isochronous packet.

In concrete, the terminal device 31*a* performs a quadlet read transaction 201 similar to the above mentioned quadlet read transaction 171*a* with respect to the destination ID field 61 by using, for example, an asynchronous packet describing the bus_ID and the node_ID of the portal 12*a*. With this transaction, the terminal device 31*a* requests of the portal 12*a* to return the values of the BANDWIDTH_AVAILABLE register 23*a* and the CHANNEL_AVAILABLE register 24*a* of the portal 12*a*.

Figure 28:
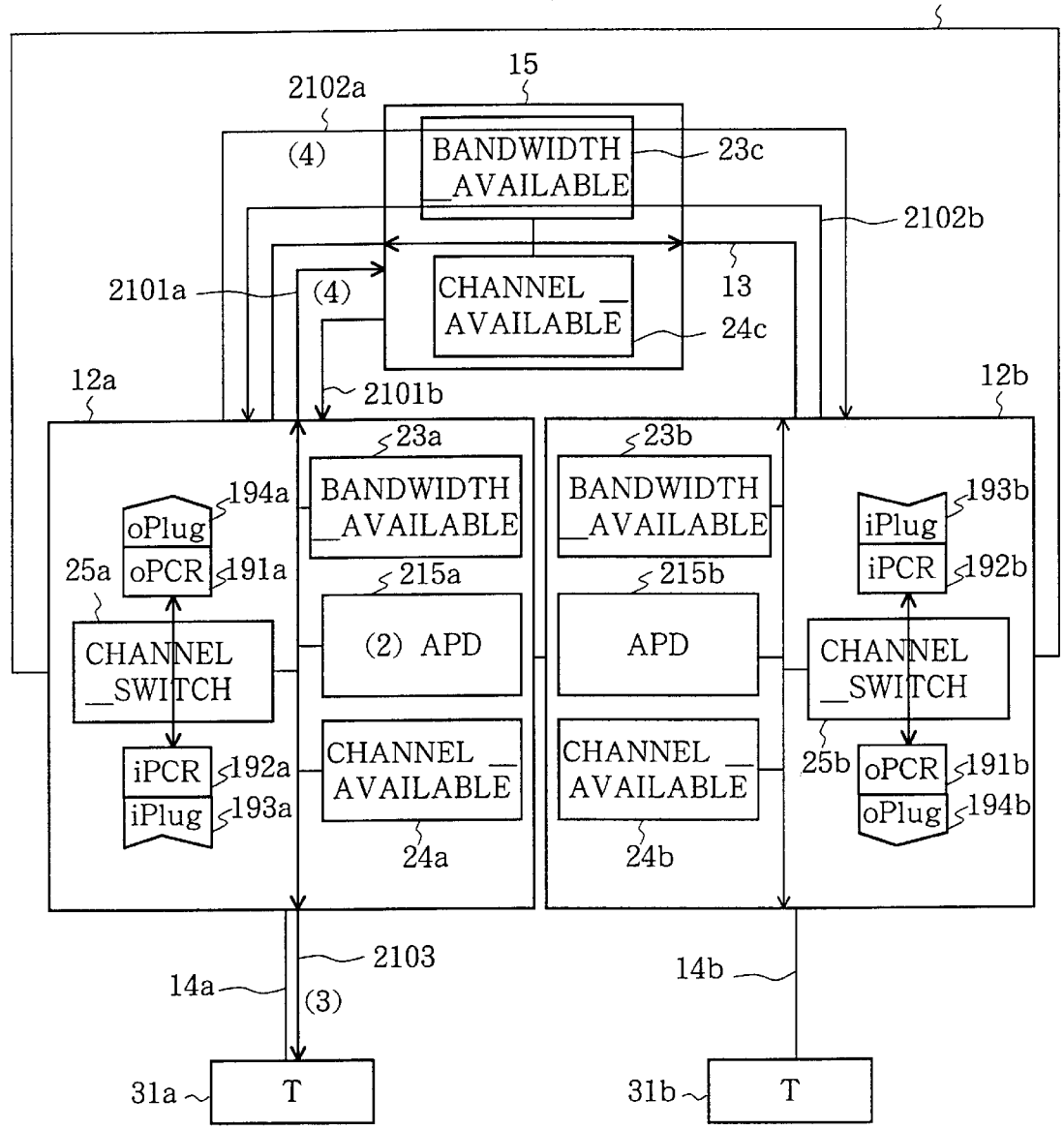
FIG. 28 is a block diagram illustrating operations of the respective portions of the serial bus network shown in FIG. 11 when the portal receives an asynchronous packet from the terminal device.

FIG. 28 shows operations of respective portions of the serial bus network shown in FIG. 11 when the portal 12*a* receives the asynchronous packet transmitted from the terminal device 31*a* in the serial bus network shown in FIG. 11.

As shown in FIG. 28,
(2) assuming that the portal 12*a* receives the asynchronous packet transmitted by the terminal device 31*a*, the asynchronous packet discriminator 215*a* determines whether or not the received asynchronous packet is a packet for inquiring of the portal 12*a* the isochronous resource of the local bus 14*b*.

In concrete, the asynchronous packet discriminator 215*a* reads the content described in the destination_ID field 61 and the destination_offset field of the received asynchronous packet and, from the content thus read, determines that the packet is the asynchronous packet for acquiring values to be stored in the BANDWIDTH_AVAILABLE register 23*a* and the CHANNEL_AVAILABLE register 24*a*.

(3) After the discrimination is performed according the procedure (2), the portal 12*a* returns the values stored in the BANDWIDTH_AVAILABLE register 23*a* and the CHANNEL_AVAILABLE register 24*a* to the terminal device 31 a as a read response 2103.

(4) Then, the portal 12*a* inquires of the bridge manager 15 the isochronous resource of the bridge bus 13 and acquires information indicative of the isochronous resource from the bridge manager 15. Further, the portal 12*a* inquires of the portal 12*b* the isochronous resource of the local bus 14*b* and acquires information indicative of the isochronous resource from the portal 12*b*. Tile above inquiries to the bridge manager 15 and the portal 12*b* are performed by performing quadlet read transactions 2101*a* and 2102*a* each similar to the previously mentioned quadlet read transaction 201 with respect to the bridge manager 15 and the portal 12*b*. In this case, the information indicative of the isochronous resource is transmitted from the bridge manager 15 and the portal 12*b* as, for example, read response 2101*b* and 2102*b* each having a similar format to the above mentioned read response 2103.

Figure 29:
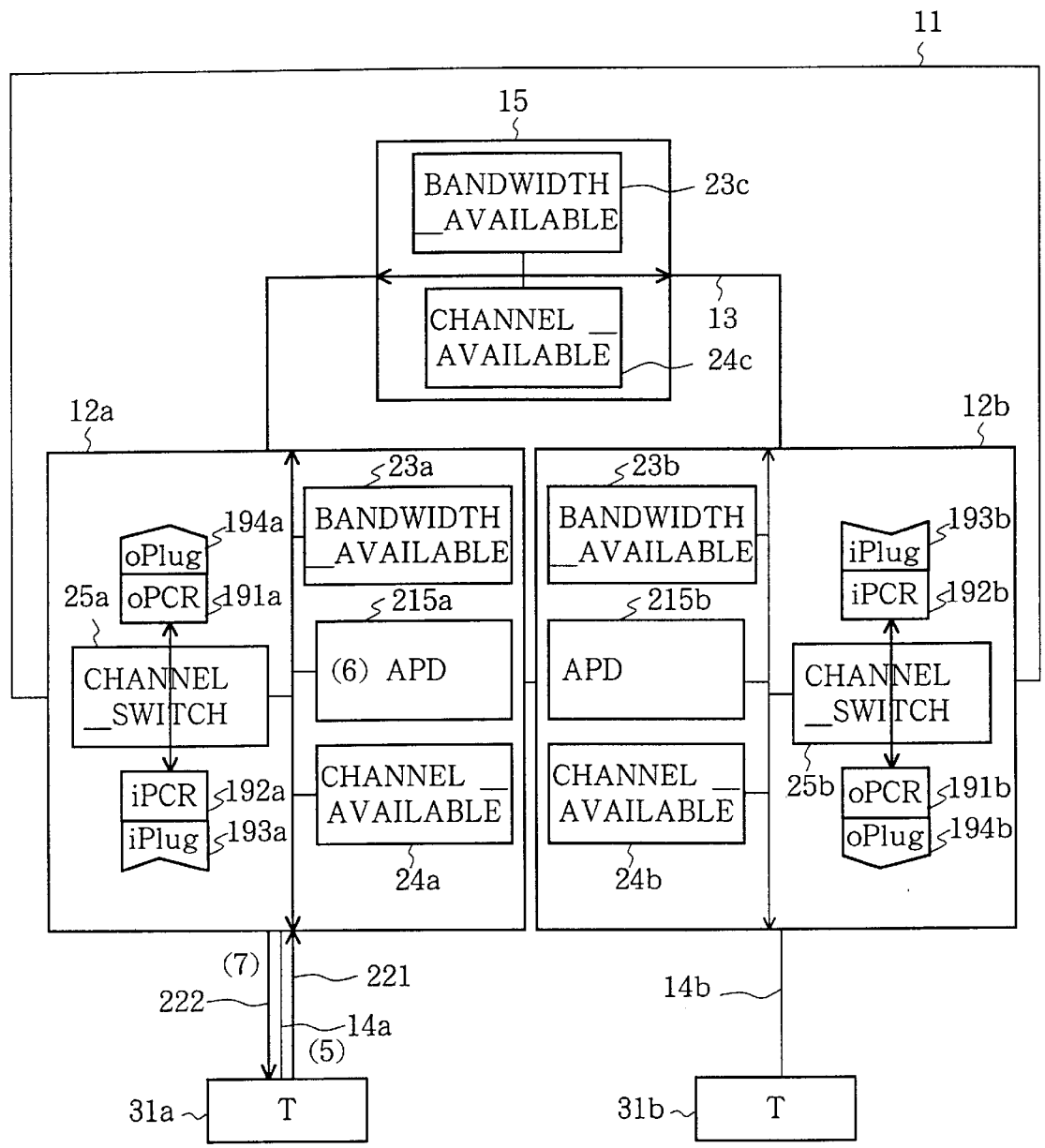
FIG. 29 is a block diagram illustrating operations of the respective portions of the serial bus network shown in FIG. 11 when an isochronous resource is acquired for the terminal device.

FIG. 29 shows operations of respective portions of the serial bus network shown in FIG. 11 when the terminal device 31*a* acquires the isochronous resource of the local bus 14*a*.

As shown in FIG. 29,
(5) the terminal device 31*a* performs a lock transaction 221 in a similar manner to that of, for example, the above mentioned lock transaction 181*a*, with respect to the portal 12*a*, by using the asynchronous packet.

(6) When the portal 12*a* receives the packet transmitted from the terminal device 31*a*, the asynchronous packet discriminator 215*a* reads the contents of the destination_ID field 61 and the extended_tcode field of the packet received by the portal 12*a*, and determines that the packet is to request the BANDWIDTH_AVAILABLE register 23*a* and the CHANNEL_AVAILABLE register 24*a* to perform the compare & swap operation. Then, the portal 12*a* performs the compare & swap operation for the BANDWIDTH_AVAILABLE register 23*a* and the CHANNEL_AVAILABLE register 24*a*.

(7) Thereafter, the portal 12*a* transmits a transmission confirmation signal 222 containing a pending code indicative of a continuation of the isochronous channel acquiring procedure to the local bus 14*a*.

Figure 30:
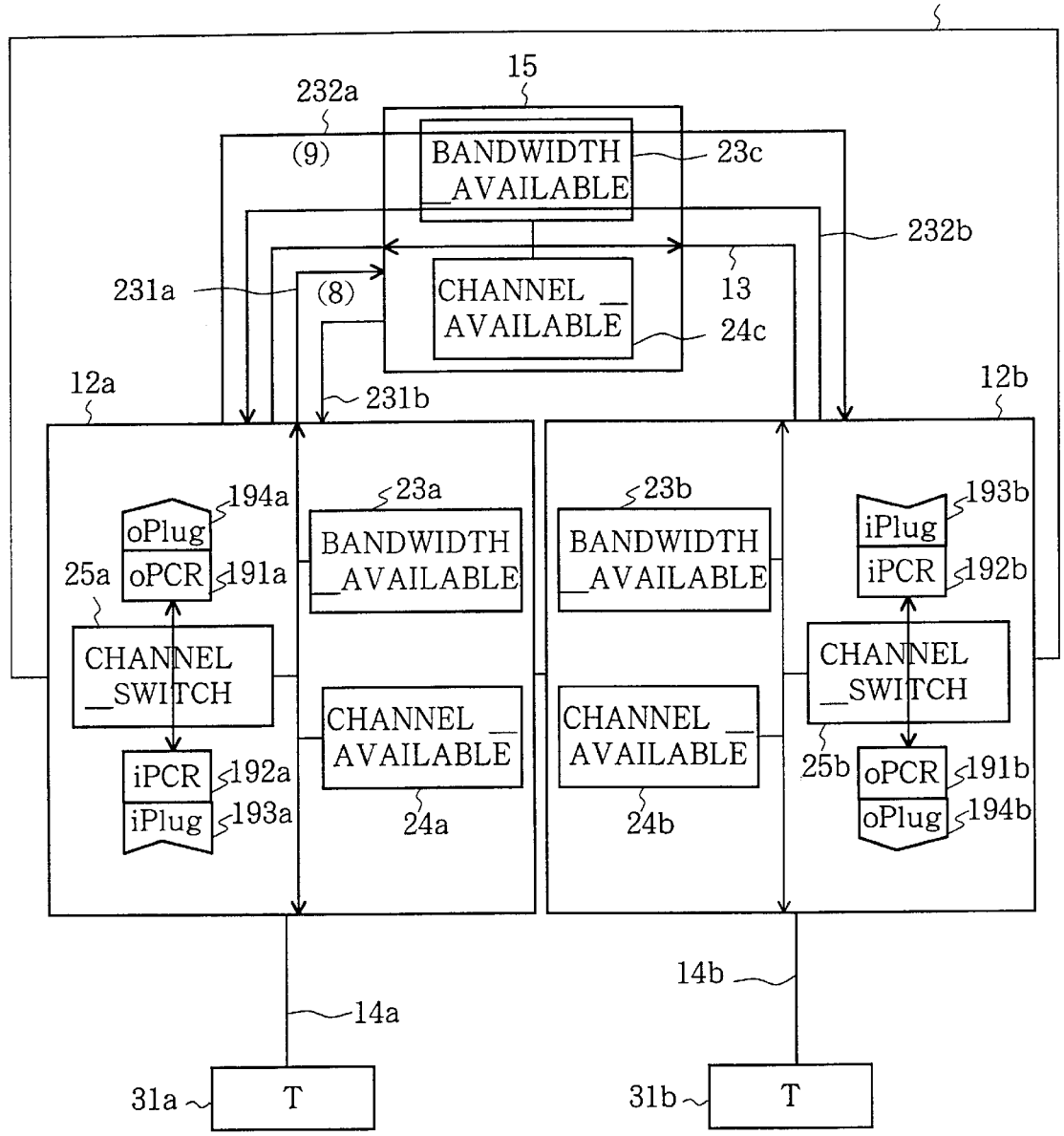
FIG. 30 is a block diagram illustrating operations of the respective portions of the serial bus network shown in FIG. 11 when the portal acquires the isochronous resource of the bridge bus and the local bus.

FIG. 30 shows operations of respective portions of the serial bus network shown in FIG. 11 when the portal 12*a* acquires the isochronous resources of the bridge bus 13 and the local bus 14*b*.

As shown in FIG. 30,
(8) the portal 12*a* performs a lock transaction 231*a* with respect to the bridge manager 15 by using the asynchronous packet. That is, the portal 12*a* acquires the isochronous resource of the bridge manager 13 by causing the bridge manager 15 to perform the compare & swap operation with respect to the BANDWIDTH_AVAILABLE register 23*c* and the CHANNEL AVAILABLE register 24*c*. Thereafter, the portal 12*a* receives a lock response 231*b* from the bridge manager 15.

Incidentally, among the secured isochronous resources, the bandwidth occupied on the bridge bus 13 by the portal 12*a* is substantially the same as the bandwidth occupied on the local bus 14*a* by the terminal device 31*a*.

(9) Then, the portal 12*a* acquires the isochronous resource on the local bus 14*b* by performing a lock transaction 232*a* with respect to the BANDWIDTH_AVAILABLE register 23*b* and the CHANNEL_AVAILABLE register 24*b* of the portal 12*b*.

Among the secured isochronous resources, the bandwidth occupied on the local bus 14*b* by the portal 12*b* is the same as the bandwidth occupied on the local bus 14*a* by the terminal device 31*a*. Thereafter, the portal 12*a* receives a lock response 232*b* from the portal 12*b*.

Figure 31:
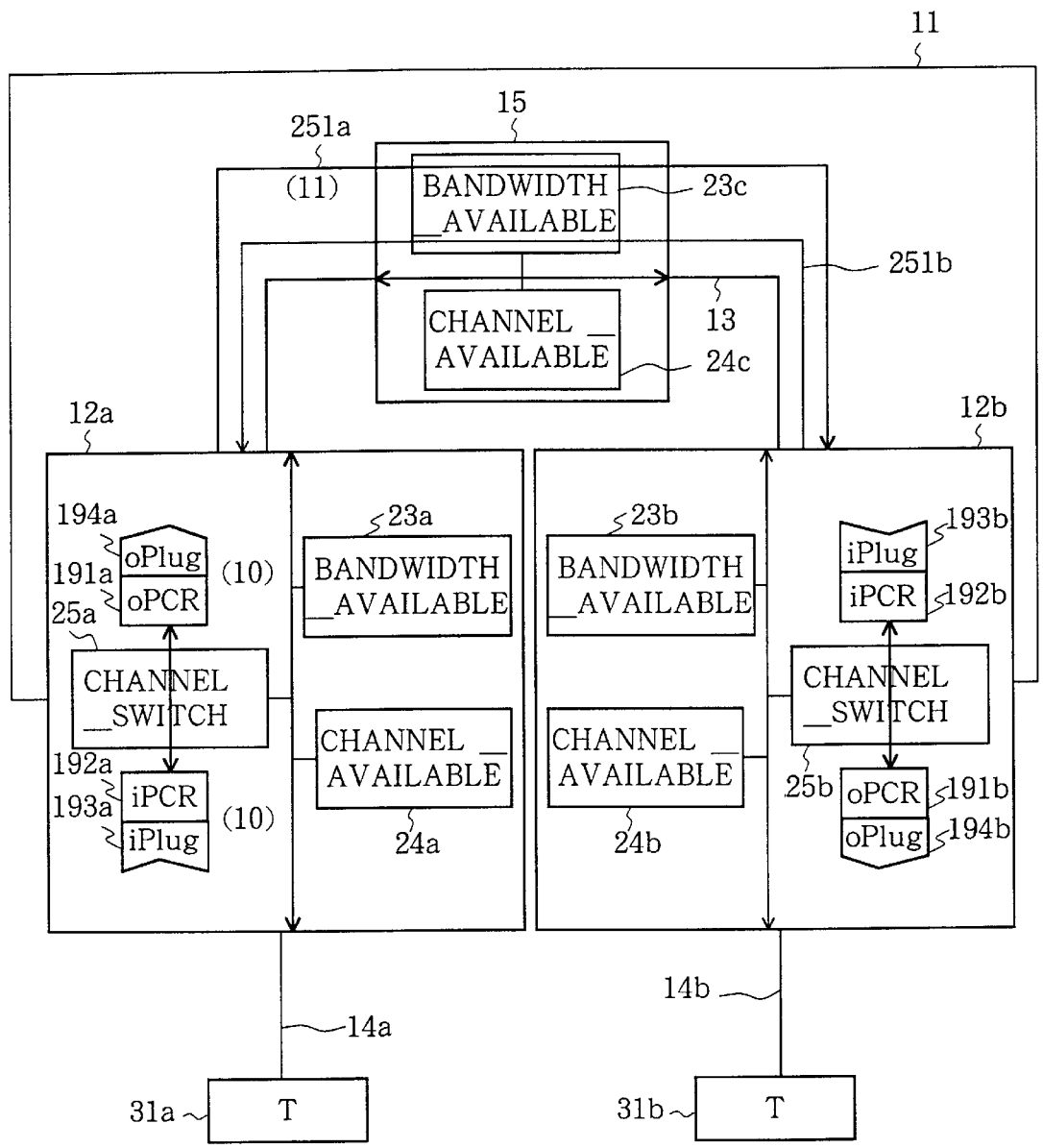
FIG. 31 is a block diagram illustrating operations of the respective portions of the serial bus network shown in FIG. 11 when a isochronous channel is related to the plug of the portal.

FIG. 31 shows operations of respective portions of the serial bus network shown in FIG. 11 when the isochronous channels secured by the bridge bus 13 and the local buses 14*a* and 14*b* are to be associated with the plugs of the portals 12*a* and 12*b*.

As shown in FIG. 31,
(10) the portal 12*a* associates the isochronous channel secured on the local bus 14*a* by the terminal device 31*a* with the iPlug 193*a* on the local bus side by performing a write transaction (data write) with respect to the iPCR 192*a* on the local bus side after the portal 12*a* acquires the isochronous resources of the bridge bus 13 and the local bus 14*b*. Further, the portal 12*a* associates the isochronous channel secured on the bridge bus 13 by the portal 12*a* with the oPlug 194*a* on the bridge bus side by performing a write transaction with respect to the oPCR 191a on the bridge bus side.

(11) Then, the portal 12a performs a lock transaction 251a similar to, for example, the above mentioned write transaction 195a with respect to the iPCR 192b on the bridge side of the portal 12b and the oPCR 191b on the local bus side. With this transaction, the isochronous channel secured on the bridge bus 13 by the portal 12a is associated with the iPlug 193b on the bridge bus side and the isochronous channel secured on the local bus 14b by the portal 12b is associated with the oPlug 194b on the local bus side.

Thereafter, the portal 12a receives a write response 251b transmitted from the portal 12b.

Figure 32:
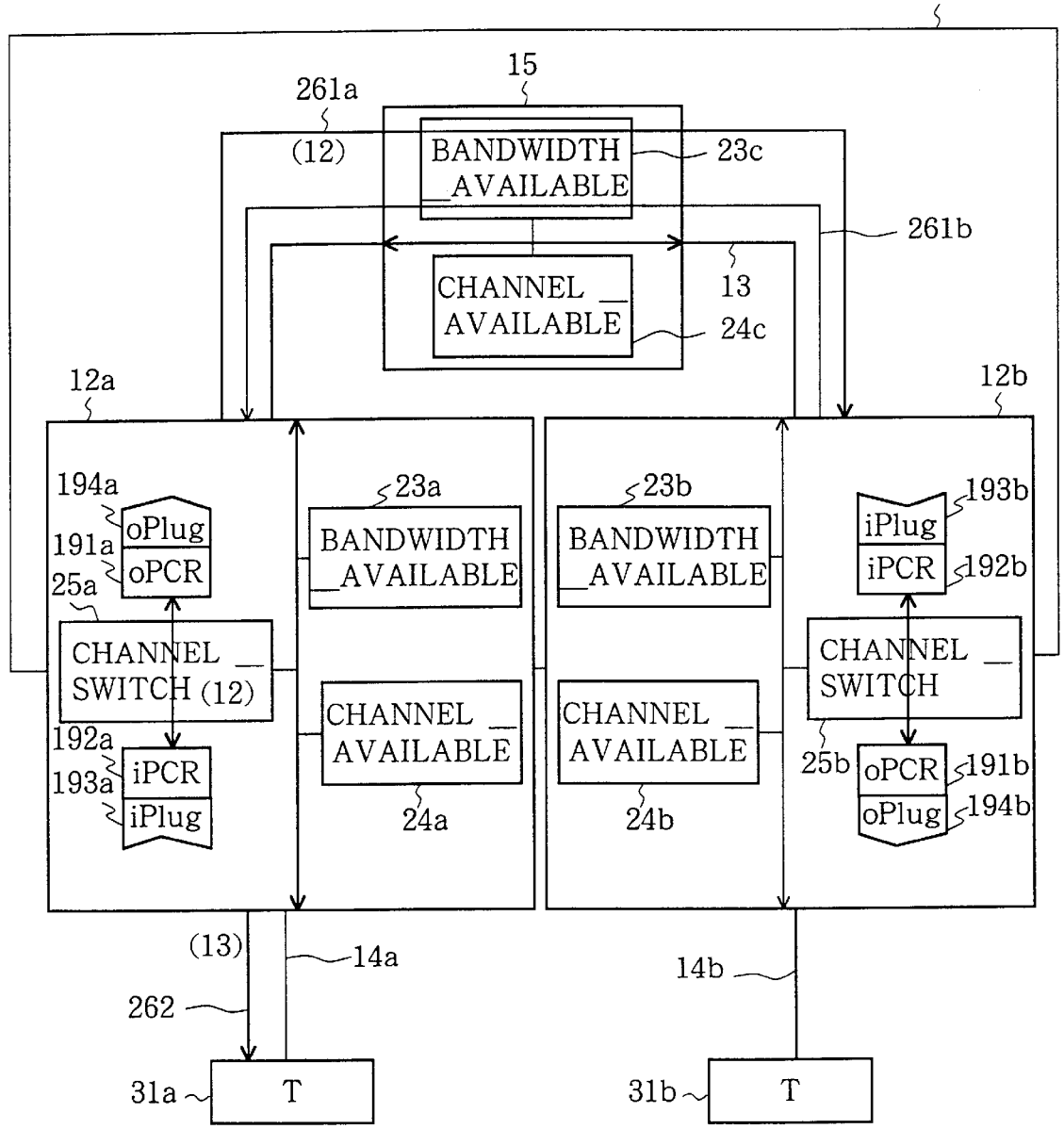
FIG. 32 is a block diagram illustrating operations of the respective portions of the serial bus network shown in FIG. 11 when the portal makes input/output plugs related mutually.

FIG. 32 shows operations of respective portions of the serial bus network shown in FIG. 11 when the portals 12a and 12b associate their plugs with each other.

As shown in FIG. 32,

(12) the portal 12a updates the content of the CHANNEL_SWITCH register 25a such that the oPlug 194a and the iPlug 193a are associated with each other. Then, the portal 12a associates the iPlug 193b with the oPlug 194b by performing a write transaction 261a with using a similar procedure to that of, for example, the above mentioned write transaction 199a with respect to the CHANNEL_SWITCH register 25b.

Thereafter, the portal 12a receives the write response 261b transmitted by the portal 12b.

(13) Thereafter, transmits the asynchronous packet (no data) 262 addressed to the terminal device 31a to the local bus 14a. In response to the asynchronous packet (no data) 262, the terminal device 31a starts a transmission of the isochronous packet.

Figure 33:
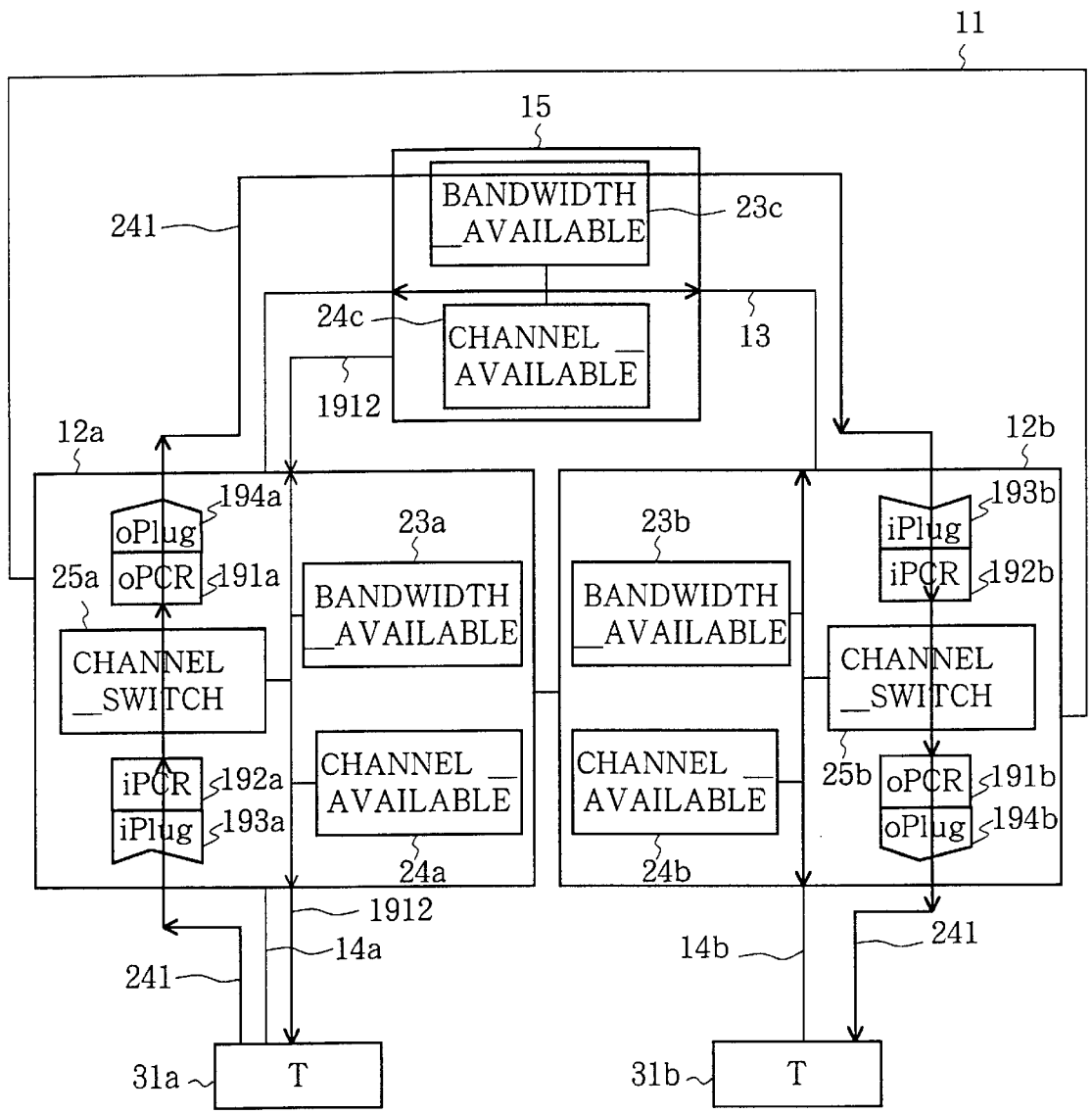
FIG. 33 shows a concrete flow of the isochronous packet.

FIG. 33 shows a flow of the isochronous packet 2143 in the serial bus network shown in FIG. 11. The flow of the isochronous packet 241 shown in FIG. 33 is substantially the same as that of the previously mentioned isochronous packet 1911 shown in FIG. 26.

Through the above mentioned procedures, the terminal device 31a in the case 2 transmits the isochronous packet to the terminal device 31b.

In the above mentioned procedures, the isochronous resource is secured first on the local bus 14a and, then, the isochronous resources are secured on the bridge bus 13 and the local bus 14b in the sequence. However, the sequence of securing the isochronous resources on these three buses may be any so long as the isochronous resources can be secured thereon.

Further, the isochronous resources are secured on the bridge bus 13, the local bus 14a and the local bus 14b by the terminal device 31b and, thereafter, the terminal device 31a may transmit the isochronous packet to these secured isochronous channel.

<Second Embodiment>

Figure 34:
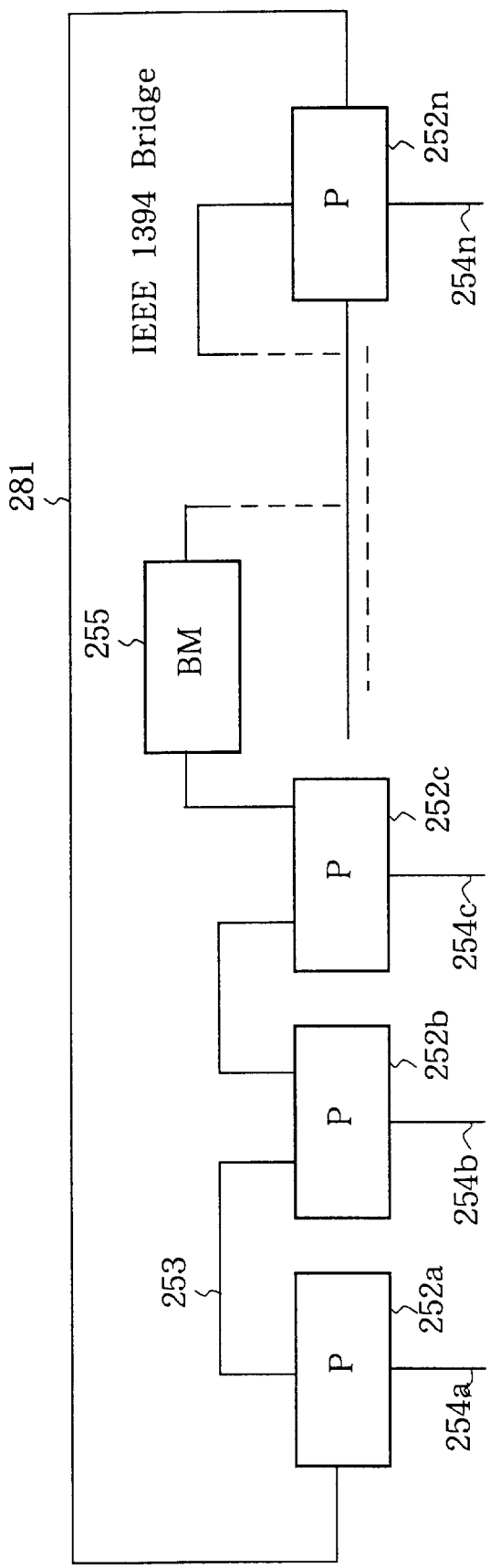
FIG. 34 is a block diagram of a bridge according to a second embodiment of the present invention.

FIG. 34 is a block diagram showing a construction of an IEEE 1394 bridge according to a second embodiment of the present invention.

Although, in the IEEE 1394 bridge 11 of the first embodiment of the present invention, the respective portals are star-connected to the bridge manager 15, the IEEE 1394 bridge 281 of the second embodiment of the present invention is constructed such that adjacent portals among portals 252a to 252n and a bridge manager 255 included in the IEEE 1394 bridge 281 are connected by bridge buses 253 to form a chain as a whole. That is, the respective portals 252a to 252n and the bridge manager 255 are connected in the daisy chain configuration as shown in FIG. 34.

In the IEEE 1394 bridge 281 having the daisy chain connected portals, an increase of the number of portals is facilitated. That is, the extendibility of the IEEE 1394 bridge is improved.

Although, in the IEEE 1394 bridge according to the first or second embodiment of the present invention, the bridge manager is provided independently from the portals, the portals and the bridge manager are not always provided separately and one of the portals may have a function of the bridge manager concurrently.

Further, the bridge bus 13 and the local buses 14a to 14n does not always constitute the serial bus standardized by the IEEE 1394 and may be any bus so long as it can transmit a serial data isochronously and asynchronously between terminal devices and portals connected to same buses.

As described, the IEEE 1394 bridge of the present invention can be realized by using a usual computer system without using any system dedicated thereto. For example, it is possible to construct the IEEE 1394 bridge for executing the previously mentioned procedures by installing a program for executing the above procedures in a micro computer from a medium (ROM, etc., which can be inserted into and/or detached from a socket) storing the program.

The medium for supplying the computer program may be a communication medium (medium holding a program temporarily and runningly such as communication circuit, communication network or communication system). For example, the program may be posted on a billboard (BBS) of a communication network and delivered through the network.

Then, the above procedures can be executed by activating this program and executing it under a control of an OS, like other application programs.

In a case where the OS bears a portion of the procedures or the OS constitutes a portion of the constitutional components of the present invention, the recording medium may store the program excluding that portion. In such case, the recording medium stores a program for executing respective functions or steps to be executed by the computer.

As described hereinbefore, a first effect of the present invention is that the IEEE 1394 bridge capable of improving the bus utilization is realized by performing the initialization of the network and the re-definition of topology while avoiding reduction of the bus utilization when a connection of a new active line to the serial network or disconnection of an existing active line from the serial network occurs. The reason for this is that, when a new active line is connected to or an existing active line is disconnected from the serial bus, the serial bus is initialized and the topology is re-defined, separately from others.

A second effect is that the IEEE 1394 bridge capable of connecting 64 or more terminal devices within the serial bus network can be realized. The reason for this is that the serial bus network is constructed by connecting a plurality of independent serial buses. A third effect of the present invention is that the IEEE 1394 bridge capable of utilizing the resources efficiently by managing resources of a plurality of serial buses mutually connected by the IEEE 1394 bridge, mutually independently, within the serial bus network constitute with these serial buses. The reason for this is that the management of resource is performed every serial bus.

A fourth effect of the present invention is that a bridge, particularly, the IEEE 1394 bridge, capable of transferring an asynchronous packet between different serial buses within the serial bus network having a plurality of serial buses mutually connected by the bridge is realized. The reason for this is that the bridge (including the IEEE 1394 bridge) of the present invention has a function of discriminating a destination of an asynchronous packet transmitted by a terminal and transferring the asynchronous packet to a serial bus to which a destination terminal device is connected.

A fifth effect of the present invention is that a bridge, particularly, the IEEE 1394 bridge, capable of transferring an asynchronous packet between different serial buses within the serial bus network having a plurality of serial buses mutually connected by the bridge is realized. The reason for this is that the bridge (including the IEEE 1394 bridge) of the present invention has a function of securing an isochronous channel for transmitting an isochronous packet between mutually different serial buses.

It should be noted that the present invention is not limited to the described embodiments and various modifications of the disclosed embodiments will become apparent for persons skilled in the art upon reference to the description of the invention.

What is claimed is:

1. A bridge comprising a plurality of portals connected to different local buses, said local buses connected to external terminal devices, said bridge further comprises an internal bus for connecting said portals mutually, wherein a particular portal comprises:

topology information memory means for storing a topology information indicative of said local buses to which respective terminal devices are connected;

packet receiving means for receiving at least one asynchronous packet sent from one of said terminal devices through one of said local buses or through said internal bus; and packet discrimination means for determining a destination local bus connected to a destination portal on the basis of destination bus information described in said asynchronous transmission packet received by said packet receiving means by referencing the topology information stored in said topology information memory means, sending the asynchronous packet to another portal connected to destination local bus different from that to which said particular portal is connected and sending the asynchronous packet to a particular local bus to which said particular portal is connected when the result of the determination of said packet discrimination means indicates the particular local bus.

2. A bridge as claimed in claim 1, wherein said bridge is an IEEE 1394 bridge and said local buses are IEEE 1394 serial buses, respectively.

3. A bridge as claimed in claim 1, wherein said topology information memory means comprises:

topology re-definition means for detecting a change of the number of said terminal devices connected to a particular local bus connected to said particular portal, specifying any terminal device connected to said particular local bus after the detection of the change of the number of said terminal devices and supplying information indicative of said terminal devices connected to said particular local bus to portals other than said particular portal; and topology information update means for producing new topology information by combining the information supplied from topology re-definition means of portals other than said particular portal and the topology information stored by said particular portal, the topology information update means storing the new topology information.

4. A bridge as claimed in claim 1, further comprising internal bus resource managing means for receiving the asynchronous transmission packet for requesting the reservation of an isochronous channel for an isochronous packet and acquiring the isochronous transmission channel on said internal bus, wherein said particular portal comprises:

local bus resource managing means for receiving the asynchronous transmission packet for requesting the reservation of the isochronous transmission channel and acquiring the isochronous transmission channel on said particular local bus connected to said particular portal;

an input port for receiving the isochronous transmission packet through said isochronous transmission channel assigned as a destination of an isochronous transmission packet transmitted by the isochronous transmission;

an output port for acquiring the isochronous transmission packet from said input port assigned as the source of the isochronous transmission packet and sending the isochronous transmission packet to the isochronous transmission channel assigned as the source of the isochronous transmission packet; and channel control means for assigning the isochronous transmission channel which becomes the source of the isochronous transmission packet to said input port, said input port which becomes the source of the isochronous transmission packet to said output port and said isochronous transmission channel which becomes a destination of the isochronous transmission packet supplied by said output port.

5. A bridge as claimed in claim 4, wherein said particular portal comprises said internal bus resource managing means.

6. A bridge as claimed in claim 4, wherein said portals are connected through said internal buses to said internal bus resource managing means.

7. A bridge as claimed in claim 4, wherein said portals and said internal bus resource managing means are connected through said internal buses to form a chain having no branch.

8. A bridge comprising at least two portals, each portal connected to a corresponding local bus, each corresponding local bus connected to an external terminal device, said bridge further comprising an internal bus which connects said portals, a particular portal comprising:

a first memory which stores topology information relating to said topology of all of said local busses connected to all of said portals;

a packet receiver which receives at least one asynchronous packet sent from one of said terminal devices through at least one of said internal bus and one of said local buses;

a packet destination detector which detects a destination local bus connected to a destination portal, said packet destination detector detecting said destination local bus based on destination bus information received in said asynchronous packet and based on said topology information;

said packet destination detector sending said asynchronous packet to another portal connected to said destination local bus when said packet destination detector determines that said destination local bus is not connected to said particular portal; and said packet destination detector sends said asynchronous packet to a particular local bus connected to said particular portal when said packet destination detector determines that said destination local bus is said particular local bus.

9. The bridge as recited in claim 8, wherein said bridge is an IEEE 1394 bridge and said local buses are IEEE 1394 serial buses.

10. The bridge as recited in claim 8, wherein said particular portal further comprises:

a controller which detects a change of the number of said terminal devices connected to a particular local bus connected to said particular portal, said controller specifies any terminal device connected to said particular local bus after the detection of the change of the number of said terminal devices and supplies information indicative of said terminal devices connected to said particular local bus to portals other than said particular portal; and said controller produces and stores new topology information by combining said information supplied from controllers of portals other than said particular portal and said topology information stored by said particular portal.

11. The bridge as recited in claim 8, further comprising:

an internal bus resource manager which receives the asynchronous packet, requests the reservation of an isochronous channel to perform an isochronous transmission of an isochronous packet and secures the isochronous transmission channel on said internal bus; and wherein said particular portal further comprises:

a local bus resource manager which receives the asynchronous transmission packet requesting the security of the isochronous transmission channel and secures the isochronous transmission channel on said particular local bus connected to said particular portal;

an input port which receives said isochronous transmission packet through said isochronous transmission channel assigned as a source of an isochronous transmission packet transmitted by the isochronous transmission;

an output port which receives said isochronous transmission packet from said input port assigned as the source of the isochronous transmission packet and which sends the isochronous packet received from said input port to the isochronous transmission channel assigned as the destination of the isochronous packet; and a channel controller which assigns the isochronous transmission channel which becomes the source of the isochronous transmission packet to said input port, said input port which becomes the source of the isochronous transmission packet to said output port and said isochronous transmission channel which becomes a destination of the isochronous transmission packet supplied by said output port.

12. The bridge as recited in claim 11, wherein said particular portal comprises said internal bus resource manager.

13. The bridge as recited in claim 11, wherein said portals are connected through said internal bus to said internal bus resource manager.

14. The bridge as recited in claim 11, wherein said portals and said internal bus resource manager are connected through said internal bus to form a chain without a branch.

* * * * *